(12) United States Patent
Gong et al.

(10) Patent No.: US 12,201,984 B2
(45) Date of Patent: Jan. 21, 2025

(54) METHOD FOR MANUFACTURING AN APPARATUS FOR MANIPULATING A DROPLET

(71) Applicant: MGI Tech Co., Ltd., Shenzhen (CN)

(72) Inventors: Jian Gong, Danville, CA (US); Liang Wang, Newark, CA (US); Yan-You Lin, Fremont, CA (US); Cheng Frank Zhong, Menlo Park, CA (US)

(73) Assignee: MGI Tech Co., Ltd., Shenzhen (CN)

( * ) Notice: Subject to any disclaimer, the term of this patent is extended or adjusted under 35 U.S.C. 154(b) by 0 days.

(21) Appl. No.: 18/503,759

(22) Filed: Nov. 7, 2023

(65) Prior Publication Data

US 2024/0066522 A1 Feb. 29, 2024

Related U.S. Application Data

(63) Continuation of application No. 17/287,920, filed as application No. PCT/CN2019/116529 on Nov. 8, 2019, now Pat. No. 11,865,543.

(Continued)

(51) Int. Cl.
*B23P 19/04* (2006.01)
*B01L 3/00* (2006.01)
(Continued)

(52) U.S. Cl.
CPC ... *B01L 3/502792* (2013.01); *B01L 3/502707* (2013.01); *B01L 3/502715* (2013.01);
(Continued)

(58) Field of Classification Search
CPC ......... G01N 27/44791; B01L 3/502707; B01L 3/502715; B01L 3/50273; B01L 3/502792;
(Continued)

(56) References Cited

U.S. PATENT DOCUMENTS 8,394,249 B2   3/2013   Pollack et al.
9,423,161 B2 *  8/2016   Ludwig .................. H10N 10/10
(Continued)

FOREIGN PATENT DOCUMENTS

CN   101146595 A   3/2008
CN   102698822 A   10/2012
(Continued)

OTHER PUBLICATIONS

International Application No. PCT/CN2019/116529, International Preliminary Report on Patentability mailed on May 20, 2021, 6 pages.

(Continued)

*Primary Examiner* — Paul D Kim

(74) *Attorney, Agent, or Firm* — Kilpatrick Townsend & Stockton LLP

(57) ABSTRACT

An apparatus for forming a plurality of microdroplets from a droplet includes a substrate, a dielectric layer on the substrate and having a plurality of hydrophilic surface regions spaced apart from each other by a hydrophobic surface, and a plurality of electrodes covered by the dielectric layer. The electrodes are configured to form an electric field across the droplet in response to voltages provided by a control circuit to move the droplet across the dielectric layer in a lateral direction while leaving portions of the droplet on the hydrophilic surface regions to form the plurality of microdroplets on the hydrophilic surface regions.

6 Claims, 22 Drawing Sheets

Related U.S. Application Data

(60) Provisional application No. 62/758,071, filed on Nov. 9, 2018.

(51) Int. Cl.
*G01N 27/447* (2006.01)
*H05K 13/04* (2006.01)
*G02B 26/00* (2006.01)

(52) U.S. Cl.
CPC .... *B01L 3/50273* (2013.01); *G01N 27/44791* (2013.01); *B01L 2200/16* (2013.01); *B01L 2300/0645* (2013.01); *B01L 2300/0819* (2013.01); *B01L 2300/165* (2013.01); *B01L 2300/1827* (2013.01); *B01L 2400/0427* (2013.01); *G02B 26/005* (2013.01)

(58) Field of Classification Search
CPC ..... B01L 2400/0427; B01L 2300/0645; B01L 2300/0663; B01L 2300/1827; B01L 2200/16; G02B 26/005
See application file for complete search history.

(56) References Cited

U.S. PATENT DOCUMENTS

| | | | |
|---|---|---|---|
| 11,865,543 B2 | 1/2024 | Gong et al. | |
| 2006/0254933 A1 | 11/2006 | Adachi et al. | |
| 2007/0023292 A1 | 2/2007 | Kim et al. | |
| 2010/0081578 A1 | 4/2010 | Wheeler et al. | |
| 2012/0261264 A1 | 10/2012 | Srinivasan et al. | |
| 2013/0217113 A1 | 8/2013 | Srinivasan et al. | |
| 2013/0333762 A1 | 12/2013 | Winger | |
| 2016/0158748 A1 | 6/2016 | Wu et al. | |
| 2016/0199832 A1 | 7/2016 | Jamshidi | |
| 2020/0393492 A1* | 12/2020 | Ko | G01R 1/07342 |

FOREIGN PATENT DOCUMENTS

| | | | |
|---|---|---|---|
| CN | 103865789 A | 6/2014 | |
| CN | 104066512 A | 9/2014 | |
| CN | 105665043 A | 6/2016 | |
| CN | 105916689 A | 8/2016 | |
| JP | 57064952 A * | 4/1982 | H01L 23/32 |
| JP | 2012150098 A | 8/2012 | |
| KR | 20140067421 A | 6/2014 | |
| WO | 2008007511 A1 | 1/2008 | |
| WO | 2018093779 A2 | 5/2018 | |

OTHER PUBLICATIONS

International Application No. PCT/CN2019/116529, International Search Report and Written Opinion mailed on Jan. 23, 2020, 9 pages.

* cited by examiner

100

```
┌─────────────────────────────────────────────────┐
│  Provide a socket configured to receive a       │
│  package containing an integrated circuit, the  │
│  socket including a socket body and plurality   │─── 1001
│  of upper contact pins on a planar surface of   │
│  the contact body                                │
└─────────────────────────────────────────────────┘
                        │
                        ▼
┌─────────────────────────────────────────────────┐
│  Provide a substrate having a first surface     │
│  including a plurality of electrodes, a         │
│  plurality of through-holes, and a plurality    │─── 1003
│  of conductive features filling the through-    │
│  holes and each having an upper portion         │
│  protruding over a second surface opposite      │
│  the first surface                               │
└─────────────────────────────────────────────────┘
                        │
                        ▼
┌─────────────────────────────────────────────────┐
│        Attach the substrate to the socket       │─── 1005
└─────────────────────────────────────────────────┘
```

FIG. 10

METHOD FOR MANUFACTURING AN APPARATUS FOR MANIPULATING A DROPLET

CROSS-REFERENCE TO RELATED APPLICATIONS

This application is a continuation of application Ser. No. 17/287,920 filed Apr. 22, 2021, which is a national phase application of PCT Application No. PCT/CN2019/116529, filed Nov. 8, 2019, which claims benefit of U.S. Provisional Application No. 62/758,071, filed Nov. 9, 2018, which are incorporated herein by reference.

FIELD OF THE INVENTION

Embodiments of the present invention relate generally to electrowetting-on-dielectric (EWOD) technology, and more particularly relate to apparatuses and methods for manipulating droplets using a multilayer ceramic substrate, a disposable substrate operable with a multilayer ceramic substrate, and a disposable substrate with a socket for an integrated circuit package.

BACKGROUND OF THE INVENTION

Electrowetting-on-dielectric (EWOD) is a liquid driving mechanism to change a contact angle of an aqueous droplet between two electrodes on a hydrophobic surface. A bulk liquid droplet as large as several millimeters (i.e., several microliters in volume) can be moved by an array of electrodes disposed on a substrate, such as an inorganic substrate (e.g., silicon/glass substrate) or organic substrate (e.g., a cyclic olefin polymer/polycarbonate substrate).

FIG. 1A is a perspective view of a schematic diagram illustrating an EWOD device 10 that may be used to explain embodiments of the present disclosure. The EWOD device includes a substrate structure 11 having a substrate 12, an insulating layer 13 on the substrate, and an array of electrodes 14 within or under the insulating layer. The array of electrodes 14 includes a first set of electrodes 14a arranged in parallel to each other and spaced apart from each other in a first direction, and a second set of electrodes arranged in parallel to each other and spaced apart from each in a second direction substantially perpendicular to the first direction. The first and second set of electrodes are spaced apart from each other within the insulating layer 13, which may include a plurality of dielectric layers of the same material or different materials. The EWOD device also includes an input-output circuit 15 in the substrate and operative to interface with a control circuit that may be integrated in the EWOD device or external to the EWOD device to provide control voltages having time-varying voltage waveforms to the array of electrodes 14.

Referring to FIG. 1A, a liquid droplet 16 disposed on the surface of the insulating layer 13 may be moved along a certain direction by turning off/on control voltages at electrodes below the droplet and at adjacent electrodes.

FIG. 1B is a cross-sectional view of the EWOD device shown in FIG. 1A taken along the line B-B'. The cross sectional view of the second set of electrodes 14b is shown. The first set of electrodes 14a (not shown) may be disposed above, below, or in the same plane as the second set of electrodes 14b and spaced apart from the second set of electrodes by one or more dielectric layers.

BRIEF SUMMARY OF THE INVENTION

Embodiments of the present disclosure provides apparatuses, systems, and methods for manipulating droplets with reagents to obtain mixed droplets, forming a multitude of extremely small drops (particles, microdroplets, or samples) from the mixed droplets, reading the DNA concentration of the samples (microdroplets) by optical detection or measuring the pH value of each sample through integrated ion-sensitive field-effect transistor (ISFET) sensors, thereby calculating the DNA concentration of the droplets. It should be noted that although the embodiments describe apparatuses and processes of measuring a pH value of droplets, the present disclosure is not limited thereto. Those of skill in the art will appreciate that the apparatuses and processes described herein may be applied to pH measurements of any aqueous and non-aqueous liquids based on pH changes within the extremely small drops (microdroplets).

In one aspect embodiment of the present disclosure, an apparatus for manipulating droplets may include a ceramic substrate having a first surface and a second surface, a first array of electrodes disposed on the first surface, a plurality of contact pads spaced apart from each other and disposed on the second surface, and one or more interconnect layers disposed between the first surface and the second surface and configured to electrically couple one or more of the plurality of contact pads to one of the first array of electrodes. In some embodiments, the ceramic substrate is a multilayer ceramic substrate including an inorganic dielectric layer (e.g., silicon dioxide, silicon nitride) on the first surface and a hydrophobic layer on the inorganic dielectric layer. In other embodiments, the ceramic substrate is a multilayer ceramic substrate including an organic dielectric layer (e.g., polyimide) on the first surface and a hydrophobic layer on the inorganic dielectric layer.

In some embodiments, the apparatus may further include a single-layer substrate having a third surface and a fourth surface and a plurality of through-holes extending from the third surface to the fourth surface, a second array of electrodes on the third surface of the ceramic substrate, and a plurality of conductive features coupled to the second array of electrodes and filling the through-holes. Each of the conductive features may include a raised portion protruding from the fourth surface of the single-layer substrate and aligned with one of the first array of electrodes. The through-holes are aligned with the first array of electrodes. In some embodiments, the single-layer substrate is a disposable substrate and may include glass, ceramic, an organic material, plastics, or the likes.

In another aspect, an apparatus for manipulating droplets may include a socket for supporting a package of an integrated circuit comprising a plurality of contact pads arranged on a planar surface of the socket and configured to receive electrical signals from the integrated circuit, and a single-layer substrate having a first surface, a second surface, and a plurality of vias extending through the single-layer substrate, and a plurality of electrodes on the first surface of the single-layer substrate and electrically coupled to the plurality of contact pads through the vias and configured to manipulate the droplet disposed on the first surface of the single-layer substrate by the electrical signals provided by the integrated circuit. In some embodiments, the socket is a ball grid array socket. In other embodiments, the socket is a land grid array socket. In some embodiments, the single-layer substrate is a disposable substrate and may include glass, ceramic, an organic material, or plastics.

In yet another aspect, an apparatus for manipulating droplets may include a multilayer ceramic substrate having a first surface and a second surface, the multilayer ceramic substrate comprising a plurality of electrical insulating layers and a plurality of electrical conductors (metal wirings)

between the electrical insulating layers, a plurality of drive electrodes on the first surface and configured to perform a plurality of manipulation operations of the droplet, a plurality of contact pads on the second surface and electrically coupled to one or more of the drive electrodes to provide a reference voltage, a dielectric layer covering the first surface including the drive electrodes, and a hydrophobic layer on the dielectric layer. In some embodiments, each of the drive electrodes has a size smaller than a footprint of the droplet. In some embodiments, the plurality of manipulation operations comprise transporting the droplet along a travel path on the first surface, mixing the droplet with one or more reagents to obtain a mixed droplet, dividing the mixed droplet into a plurality of microdroplets for detection, and collecting the microdroplets in a waste region after the detection. In some embodiments, the first surface of the multilayer ceramic substrate includes a first region having an inlet for receiving the droplet, a second region having one or more reservoirs for storing one or more reagents, a third region in communication with the first and second regions and configured to mix the droplet with the one or more reagents to obtain a mixed droplet, a fourth region in communication with the third region and configured to divide the mixed droplet into a plurality of equal-sized microdroplets for analysis, and a fifth region in communication with the fourth region and configured to collect the microdroplets after being analyzed. In some embodiments, the apparatus further includes a second substrate opposite the multilayer ceramic substrate and forms together with the multilayer ceramic substrate a channel for the droplet and the microdroplets, the second substrate includes a sixth region facing the fourth region including a plurality of sensors associated with the microdroplets. In some embodiments, each sensor may include an ion sensitive field effect transistor including an ion sensing film configured to be exposed to a solution containing in a microdroplet and provide a signal associated with a concentration level of the solution of the microdroplet, and a reference voltage electrode configured to apply a reference voltage to the solution.

In still another aspect, a method for manufacturing an apparatus for manipulating a droplet may include providing a multilayer ceramic substrate having a first surface comprising an array of drive electrodes and a second surface opposite the first surface and comprising a plurality of contact pads in electrical contact with one or more of the drive electrodes, coating a dielectric layer on the first surface of the multilayer ceramic substrate, and coating a hydrophobic layer on the dielectric layer. In some embodiment, the method may further include providing a second substrate comprising a third surface, a fourth surface opposite the third surface, and a plurality of through-holes extending through the second substrate. The second substrate includes an array of electrode pads disposed on the third surface and plurality of conductive features filling the through-holes. Each of the conductive features includes a raised portion protruding from the fourth surface and aligned with one of the array of drive electrodes. In some embodiment, the method may also include forming a hydrophobic dielectric layer on the third surface of the second substrate. In some embodiment, the method may also include attaching the second substrate to the multilayer ceramic substrate using a fastening member so that the array of electrode pads are in electrical and physical contact with the array of drive electrodes.

In still another aspect, a method for manufacturing an apparatus for manipulating a droplet may include providing a socket for supporting a package of an integrated circuit comprising a plurality of contact pads arranged on a planar surface of the socket and configured to receive electrical signals from the integrated circuit, a single-layer substrate having a first surface, a second surface, and a plurality of vias extending through the single-layer substrate, and a plurality of electrodes on the first surface of the single-layer substrate and electrically coupled to the plurality of contact pads through the vias and configured to manipulate the droplet disposed on the first surface of the single-layer substrate by the electrical signals provided by the integrated circuit.

In still another aspect, an apparatus for manipulating a droplet may include a ceramic substrate having a first surface for receiving the droplet, a dielectric layer disposed on the first surface of the ceramic substrate, a plurality of electrodes covered by the dielectric layer and configured to manipulate the droplet in response to electrical signals provided to the plurality of electrodes. In one embodiment, the apparatus may further include an opposite substrate having a second face facing the first surface of the ceramic substrate and spaced apart from the ceramic substrate to form an air gap for the droplet. The opposite substrate may include a common electrode disposed on the second face. The opposite substrate may further include a plurality of sensors configured to detect characteristics of the droplet.

This summary is provided to introduce the different embodiments of the present disclosure in a simplified form that are further described in detail below. This summary is not intended to be used to limit the scope of the claimed subject matter. Other features, details, utilities, and advantages of the claimed subject matter will be apparent from the following detailed description.

Definitions

The terms "wafer" and "substrate" are to be understood as including silicon-on-insulator (SOI) or silicon-on-sapphire (SOS) technology, doped and undoped semiconductors, epitaxial layers of silicon supported by a base semiconductor foundation, and other semiconductor structures. Furthermore, when reference is made to a "wafer" or "substrate" in the following description, previous process may have been utilized to form regions or junctions in the base semiconductor structure or foundation. In addition, the semiconductor need not be silicon-based, but could be based on silicon-germanium, germanium, or gallium arsenide.

The term "computer readable medium" as used herein refers to any medium that participates in providing instructions to the processor of the controller for execution. A computer readable medium may take many forms, including but not limited to, nonvolatile media, volatile media, and transmission media. Nonvolatile media includes, for example, optical disks, magnetic disks, and magneto-optical disks, such as the hard disk or the removable media drive. Volatile media includes dynamic memory, such as the main memory. Moreover, various forms of computer readable may be involved in carrying out one or more sequences of one or more instructions to the processor of the controller for execution. For example, the instructions may initially be carried on a magnetic disk of a remote computer. The remote computer can load the instructions for implementing all or a portion of the present invention remotely into a dynamic memory and send the instructions over a network to the controller.

The term "hydrophobic" refers to a material having a contact angle of water in air of greater than or equal to 90 degrees. In certain embodiments, hydrophobic surfaces may feature contact angle greater than 90 degrees, such 120 degrees, 150 degrees, etc. In contrast, the term "hydrophilic" refers to a material having a contact angle of water in air or immiscible liquid such as oil of less than 90 degrees.

The term "droplet" has its normal meaning in the art and refers to a liquid with boundaries formed at least in part by surface tension having a certain volume, e.g., between about several milliliters ($10^{-3}$) to about several microliters ($10^{-6}$). A droplet may be a water-based (aqueous) droplet including any organic or inorganic species such as, biological molecules, proteins, living or dead organisms, reagents, and any combination thereof. A droplet may be a non-aqueous liquid. A droplet may be spherical or non-spherical and have a size ranging from 1 micron to of about several millimeters. A droplet may be partitioned into multiple very small portions (small droplets) that are spaced apart from each other and having a substantially uniform size. The very small portions may have a volume of between 1 microliter ($10^{-6}$ L or mL) and 100 nanoliter ($10^{-9}$ liter or nL), between 100 nL and 10 10 nL, between 10 nL and 100 pL ($10^{-12}$ liter), 100 pL and 10 pL. In certain embodiments, the very small portions may have a volume of a few picoliters. The very small portions are alternatively referred to as microdoplets in the present disclosure.

The term "reagent" refers to a molecule or a compound of different molecules being able to induce a specific reaction with a species present in a droplet.

BRIEF DESCRIPTION OF THE DRAWINGS

FIG. 3A is a simplified top view illustrating that a droplet is discharged on a first electrode of an array of electrodes according to an embodiment of the present disclosure. FIG. 3B is a simplified top view illustrating that the droplet is moved to a second (adjacent) electrode under the effect of electric fields by the EWOD device according to an embodiment of the present disclosure.

FIG. 3C is a simplified top view illustrating that the droplet is moved out of the array of electrodes while leaving a residue on the second electrode according to an embodiment of the present disclosure.

FIG. 10 is a simplified flowchart illustrating a method for manufacturing an apparatus for manipulating a droplet according to an embodiment of the present disclosure.

Figure 1A:
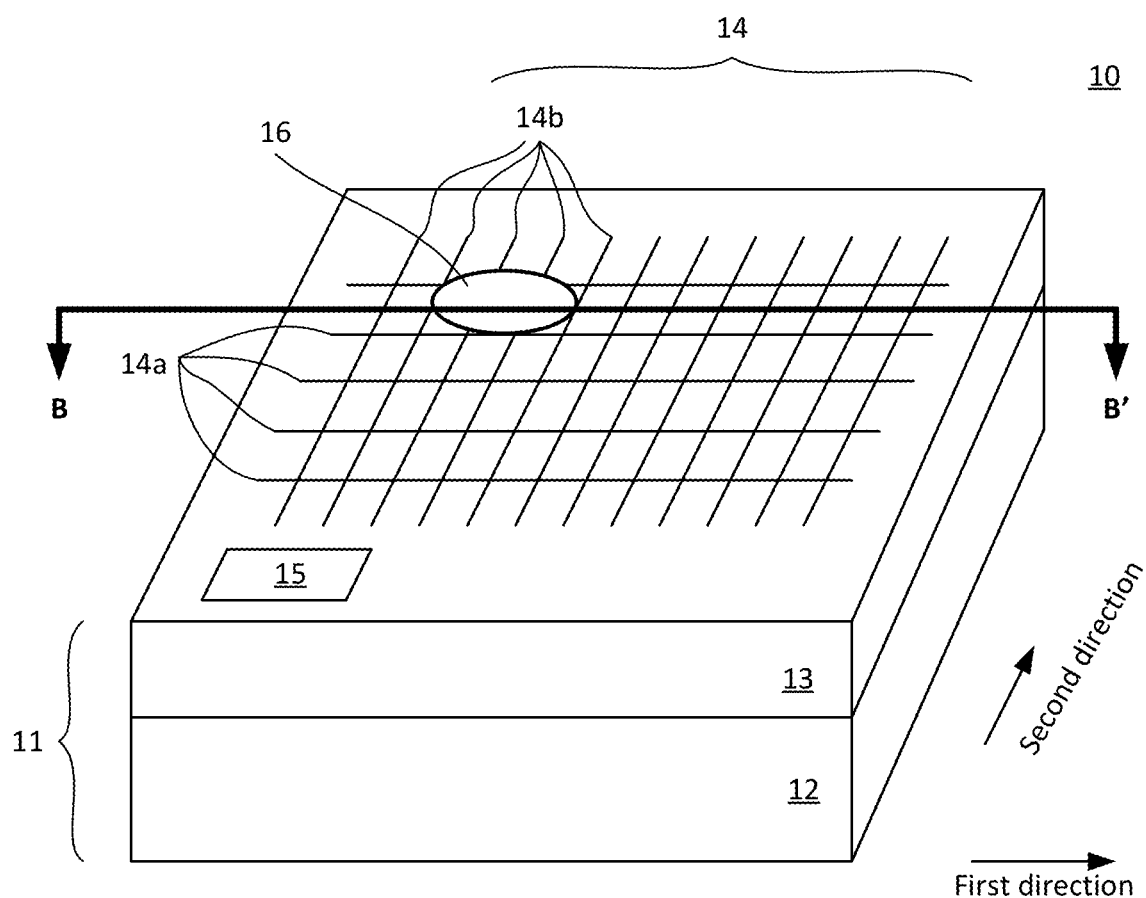
FIG. 1A is a simplified perspective view of a schematic diagram illustrating an EWOD device that may be used to explain embodiments of the present disclosure.

In accordance with common practice, the described features and elements are not drawn to scale but are drawn to emphasize features and elements relevant to the present disclosure.

DETAILED DESCRIPTION

It will be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

In the following detailed description, reference is made to the accompanying drawings which form a part hereof, and in which is shown by way of illustration specific embodiments in which the invention may be implemented. The term "upper", "lower", "vertical", "horizontal", "depth", "height", "width", "top", "bottom", etc., is used with reference to the orientation of the Figures being described. Because components of embodiments of the present invention can be positioned in a number of different orientations, the term is used for purposes of illustration and is not limiting.

The use of the terms first, second, etc. do not denote any order, but rather the terms first, second, etc. are used to distinguish one element from another. Furthermore, the use of the terms a, an, etc. does not denote a limitation of quantity, but rather denote the presence of at least one of the referenced items.

As used herein, turning off an electrode refers to lowering the voltage of that electrode to a level below a common voltage, such as connecting an electrode to a ground potential. Alternatively, turning off an electrode may also refer to setting that electrode in a floating state. Conversely, turning on an actuation electrode refers to increasing the voltage of that actuation electrode to a level above the common voltage. The common voltage may be any voltage that is shared by a number of circuit elements of the EWOD device, e.g., the ground potential.

As used herein, a droplet is an encapsulated liquid. A droplet may be spherical or non-spherical. A droplet may be partitioned into multiple very small portions (microdroplets) that are spaced apart from each other and having a substantially uniform size. The very small portions of the droplet are alternatively referred to as microdroplets in the present disclosure.

Figure 2A:
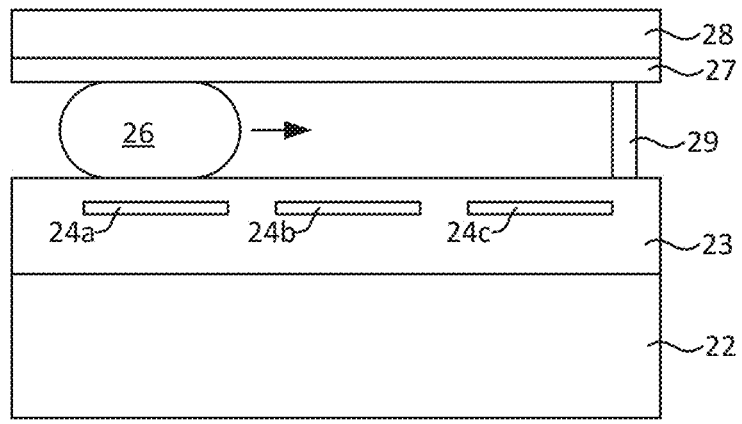
FIG. 2A is a simplified cross-sectional view of a portion of an EWOD device according to an embodiment of the present disclosure.

FIG. 2A is a simplified cross-sectional view of a portion of an EWOD device 20A according to an embodiment of the present disclosure. Referring to FIG. 2A, the EWOD device 20A includes a first substrate 22, a dielectric layer 23 on the substrate 21, a set of actuation electrodes 24 (e.g., 24a, 24b, 24c) within the dielectric layer 23, a common electrode 27 attached to a second substrate 28 and facing toward the actuation electrodes 24. The common electrode 27 may be grounded or have other common voltage. The dielectric layer 23 and the common electrode 27 are spaced apart from each other by a spacer 29. Referring to FIG. 2A, a liquid droplet 26 is disposed between the actuation electrodes 24 and the common electrode 27 and is moving along a lateral direction across the surface of the dielectric layer 23 by means of changing or varying the voltage levels applied to the actuation electrodes in relation to the common electrode. In an embodiment, the EWOD device 20A may further include a control circuit (not shown) configured to provide control voltages to the common electrode and the actuation electrodes. By turning on and off voltages applied to the actuation electrodes, the control circuit can move the liquid droplet 26 in a lateral direction across the surface of the dielectric layer 23. For example, an electric field is generated by applying a first voltage to the actuation electrode 24a below the droplet 26 and a second voltage to the adjacent actuation electrode 24b, the generated electric field causes the droplet 26 to move toward the actuation electrode 24b. The moving speed of the droplet 26 can be controlled by the magnitude of a voltage difference between the adjacent actuation electrodes. In one embodiment, the form of the liquid droplet 26 can be changed by varying the voltage difference between the actuation electrodes 24 and the common electrode 27 where the droplet 26 is disposed therebetween. It is understood that the number of actuation electrodes in the set of actuation electrodes can be any integer number. In the example shown in FIG. 2A, three actuation electrodes are used in the set of actuation electrodes. But it is understood that the number is arbitrary chosen for describing the example embodiment and should not be limiting.

Referring to FIG. 2A, two substrate structures may be separately formed. For example, a first substrate structure may be formed including the substrate 22, the dielectric layer 23, and the actuation electrodes 24 within the dielectric layer 23. The substrate 22 may be a thin-film transistor (TFT) array substrate formed by conventional thin-film transistor manufacturing processes. A second substrate structure may include a substrate 28 and a common electrode layer 27 on the substrate 28. A spacer 29 may be formed either on the first substrate structure or the second substrate structure. In certain embodiments, the spacer 29 has a height in the range between several micrometers to several millimeters. In general, the height of the spacer 29 is less than the diameter of the droplet such that the droplet disposed on the dielectric layer 23 has physical contact with the second substrate structure. The first and second substrate structures are then bonded together to form the EWOD device 20A. In other words, the space or air gap between the first substrate structure and the second substrate structure is determined by the height or thickness of the spacer 29. The space or air gap forms a channel for the droplet.

In the embodiment shown in FIG. 2A, the common electrode 27 and the set of actuation electrodes 24 (e.g., 24a, 24b, 24c) are connected to voltages provided by a control circuit (not shown) through the input-output circuit 15 shown in FIG. 1A. In some embodiments, the common electrode may be connected to a ground potential or a stable DC voltage. The control circuit applies time varying voltages through the input-output circuit to the set of actuation electrodes through respective electronic switches (that can be, e.g., thin film transistors or MOS circuitry in the substrate or off-chip) to generate an electric field across the droplet to move the droplet along a path. In some embodiments, the surface of the common electrode 27 is covered by an insulating layer made from a hydrophobic material. In other embodiments, the surface of the dielectric layer 23 is coated with a thin hydrophobic film having a submicron thickness.

Figure 2B:
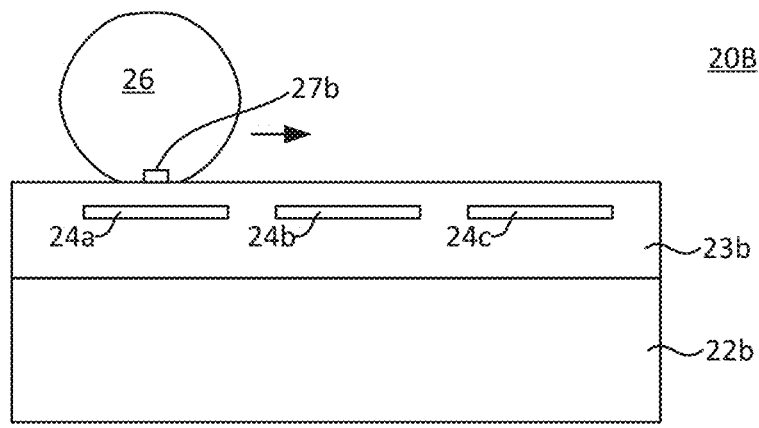
FIG. 2B is a simplified cross-sectional view of a portion of an EWOD device according to another embodiment of the present disclosure.

FIG. 2B is a simplified cross-sectional view of a portion of an EWOD device 20B according to another embodiment of the present disclosure. Referring to FIG. 2B, the EWOD device 20B includes a substrate 22b, a dielectric layer 23b on the substrate 21b, a set of actuation electrodes 24 (24a, 24b, 24c) within the dielectric layer 23b, and a set of common electrodes 27 (only one electrode 27b is shown) overlying the dielectric layer 23b. The common electrode 27b and the actuation electrodes are spaced apart from each other by a portion of the dielectric layer. Similar to FIG. 2A, the droplet 26 can be moved along a path in the lateral direction across the surface of the dielectric layer 23b by applying a first voltage at the actuation electrode (e.g., 24a) below the droplet 26 and a second voltage at the adjacent actuation electrode (e.g., 24b). The movement and direction of the droplet 26 is thus controlled by the control circuit (not shown) which applies voltages to certain actuation electrodes through a set of electronic switches (MOS circuitry in the substrate 22b, not shown). Different to the EWOD 20A shown in FIG. 20A, the EWOD device 20B has the common electrode 27b close to the actuation electrodes 24, and the droplet 26 is not sandwiched between the common electrode 27 and the actuation electrodes 24. The EWOD device 20B also differs from the EWOD 20A by not having the spacer 29.

Referring to FIG. 2B, the set of actuation electrodes 24 and the set of common electrodes 27 may be two layers of strip electrodes intersected with each other on different planes on the substrate. The actuation electrodes 24 and the common electrodes 27 are operative to move the droplet 26 across the surface of the dielectric layer 23b. In some embodiments, the common electrode 27b has a surface that is covered by an insulating layer made from a hydrophobic material. In other embodiments, the surface of the dielectric layer 23 is coated with a thin hydrophobic film having a submicron thickness.

Figure 2C:
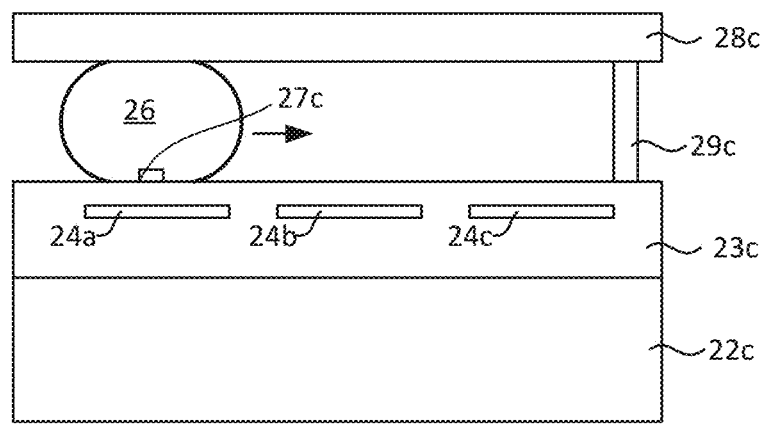
FIG. 2C is a simplified cross-sectional view of a portion of an EWOD device according to yet another embodiment of the present disclosure.

FIG. 2C is a cross-sectional view of a portion of an EWOD device 20C according to yet another embodiment of the present disclosure. Referring to FIG. 2C, the EWOD device 20C includes a substrate 22c, a dielectric layer 23c on the substrate 22c, a set of actuation electrodes 24 (e.g., 24a, 24b, 24c) within the dielectric layer 23c, a set of common electrode (e.g., one common electrode 27c is shown) overlying the dielectric layer 23c. The common electrode 27c and the actuation electrodes are spaced apart from each other by a portion of the dielectric layer. In some embodiments, the common electrode 27c has a surface that is covered by an insulating layer made from a hydrophobic material or a thin film of submicron hydrophobic coating on the surface of dielectric layer 23. The EWOD device 20C may further include a second substrate 28c spaced apart from the substrate 21c through a spacer 29c. Similar to FIG. 2A, the droplet 26 can be moved along a path within the channel formed by a space or air gap between the surface of the dielectric layer and the second substrate 28c. The movement of the droplet is controlled by voltages applied to the electrodes through electronic switches by a control circuit (not shown).

Figure 2D:
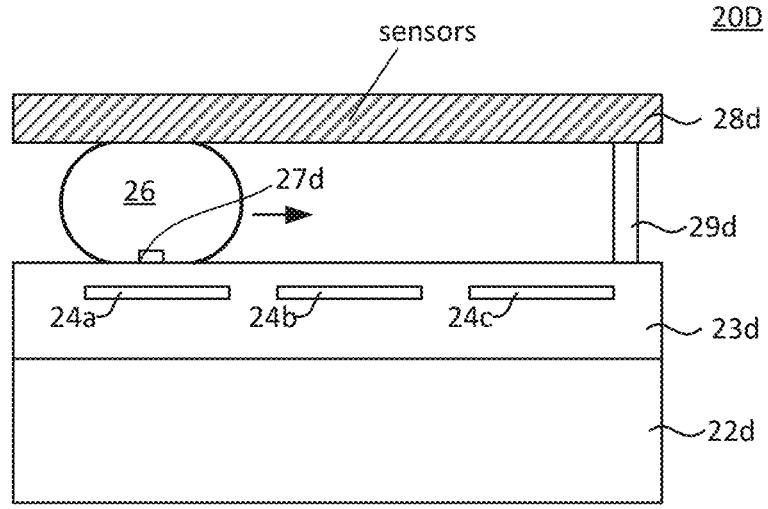
FIG. 2D is a cross-sectional view of a portion of an EWOD device having a second substrate including a plurality of sensors according to still another embodiment of the present disclosure.

FIG. 2D is a cross-sectional view of a portion of an EWOD device 20D according to still another embodiment of the present disclosure. FIG. 2D is similar to FIG. 2C with the difference that the second substrate 28d includes a plurality of sensors that are configured to detect characteristics of the droplet.

Figure 2E:
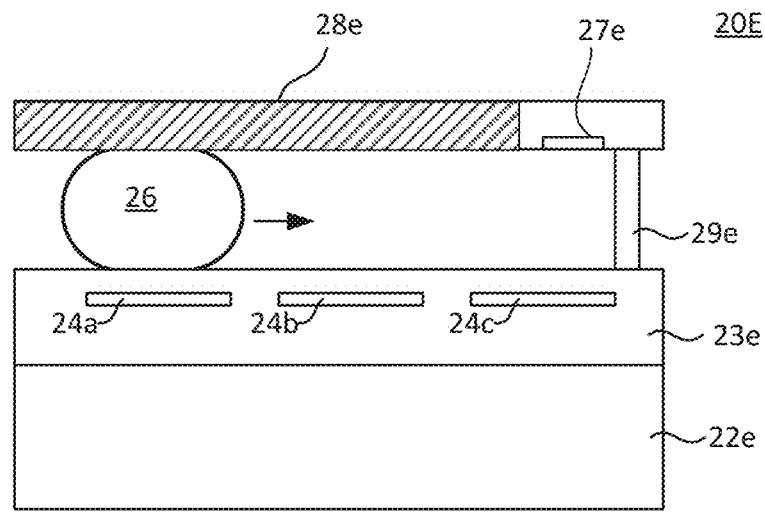
FIG. 2E is a cross-sectional view of a portion of an EWOD device having a second substrate including a plurality of sensors and one or more reference electrodes according to still according to still another embodiment of the present disclosure.

FIG. 2E is a cross-sectional view of a portion of an EWOD device 20E according to still another embodiment of the present disclosure. FIG. 2E is similar to FIG. 2D with the difference that the common electrode 27e is integrated in the second substrate 28e together with a plurality of sensors that are configured to detect characteristics of the droplet.

Figure 2F:
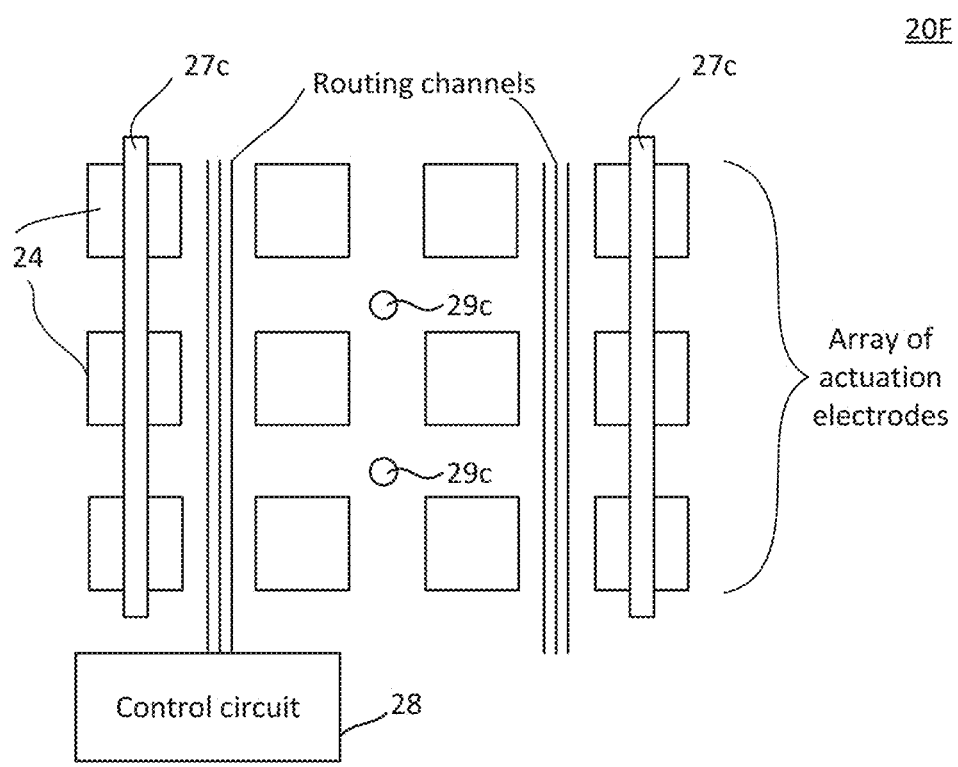
FIG. 2F is a simplified plan view of an EWOD device according to an exemplary embodiment of the present disclosure.

FIG. 2F is a simplified plan view of an EWOD 20D according to an exemplary embodiment of the present disclosure. Referring to FIG. 2F, the actuation electrodes are arranged in an array having routing channels for routing electrical signals from a control circuit 28 to the actuation electrodes 24 and to the common electrodes 27c. The spacer 29c is shown to have a circular cross-section, however, the circular cross-sectional shape is not limiting and any other cross-sectional shapes are equally suitable such as square, rectangular, oval, elliptic and other shapes. Similarly, the actuation electrodes are shown to have a square shape, but the square shape is not limiting and other shapes are equally suitable such as rectangular, circular, oval, elliptic and other shapes. In one embodiment, the spacer 29c is spaced at a distance to leave sufficient space to allow free movement of the droplet. In order words, the spacer 29c is dimensioned and spaced such a way that it does not hinder movements of the droplet across the surface of the dielectric layer. It will be understood that although the routing channels are shown as coplanar with the array of electrodes, one of skill in the art will appreciate that the routing channels and the control circuit can be disposed in the substrate and in different layers of the dielectric layer. It will also be understood that the actuation electrodes 24 and the common electrodes 27c can have their relative positions transposed, i.e., the common electrodes may be disposed below the actuation electrodes.

In another embodiment, the EWOD device may have a single array of electrodes. In other words, the common electrodes and the actuation electrodes are coplanar, i.e., the common electrodes and the actuation electrodes are arranged in a same plane within the dielectric layer. For example, a plurality of actuation electrodes and a plurality of common electrodes are arranged alternatively adjacent to each other, the control circuit may apply DC or AC voltages and ground potential sequentially to the actuation electrodes and common electrodes to control the movement of the droplet. In yet another embodiment, each electrode in the array of electrodes is individually controlled by a control circuit through a set of electronic switches such that each electrode can be an actuation electrode at a first time period and a common electrode at a second time period.

Figure 2G:
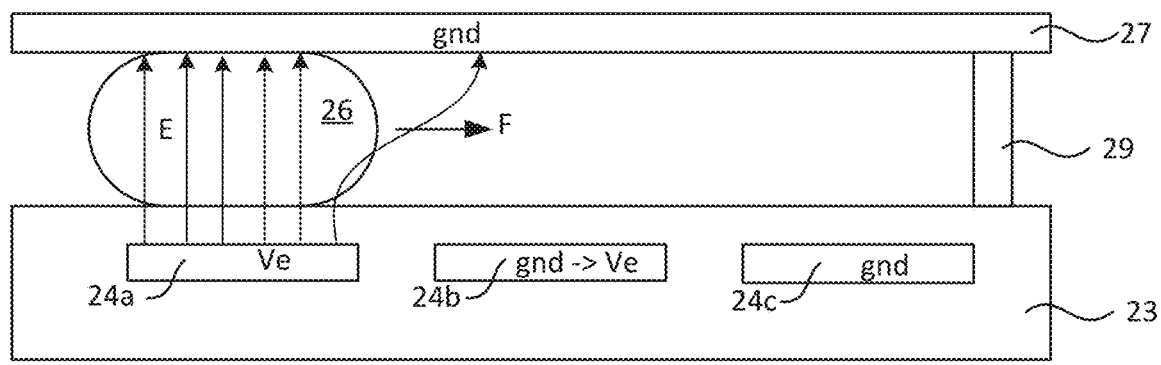
FIG. 2G is a simplified cross-sectional view illustrating electric fields generated by electrodes according to an embodiment of the present disclosure.

FIG. 2G is a simplified cross-sectional view illustrating exemplary electric fields E generated by electrodes according to an embodiment of the present disclosure. Referring to FIG. 2G, a common electrode 27 may be driven by a ground potential (gnd), and actuation electrodes 24a, 24b, 24c may be driven by a DC or AC voltage (Ve) in a time-sequential manner. For example, an DC voltage is first applied to the electrode 24a, the voltage difference between the actuation electrode 24a and the common electrode 27 generates an electric field E that moves the droplet 26 along the microchannel defined by the electrode 27 and the dielectric layer 23. By setting a voltage at an electrode adjacent to the droplet 26, the droplet 26 can be moved to that electrode along the lateral direction between the dielectric layer 23 and the common electrode 27. This structure is similar or the same as the EWOD device shown in FIG. 2A. In one embodiment, the DC voltages may be provided by a control circuit through the input-output circuit 15 shown in FIG. 1A). The main electric field is perpendicular to the surface of the dielectric layer 23.

Figure 2H:
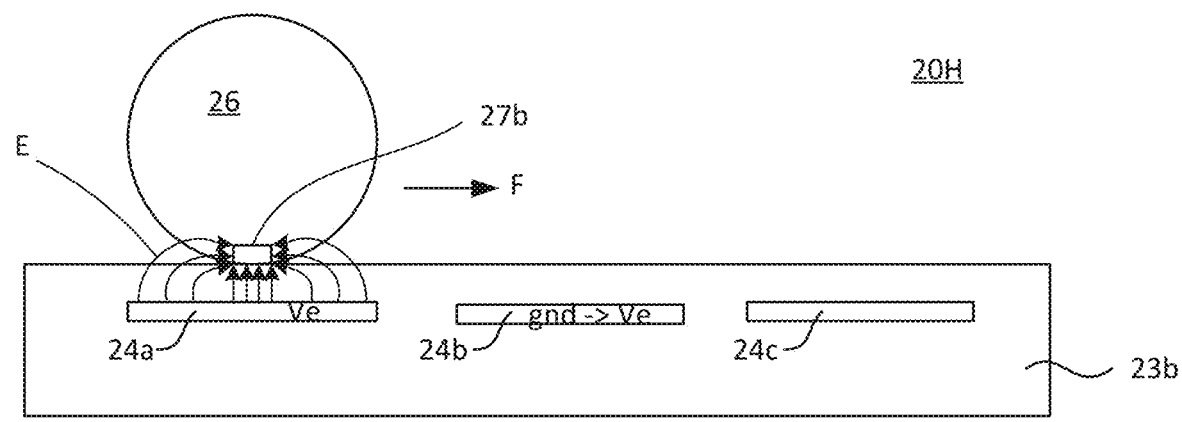
FIG. 2H is a simplified cross-sectional view illustrating electric fields generated by electrodes according to another embodiment of the present disclosure.

FIG. 2H is a simplified cross-sectional view illustrating exemplary electric fields generated by electrodes according to another embodiment of the present disclosure. Referring to FIG. 2H, a control circuit (not shown) may apply DC or AC voltages to the electrodes 24a, 24b, 24c, and 27b in a time-sequential manner to generate electric field patterns that control the movement of the droplet 26. For example, a voltage set at an electrode adjacent to the droplet will move the droplet onto that electrode. This structure is the same or similar to the EWOD device shown in FIG. 2B or 2C.

Figure 2I:
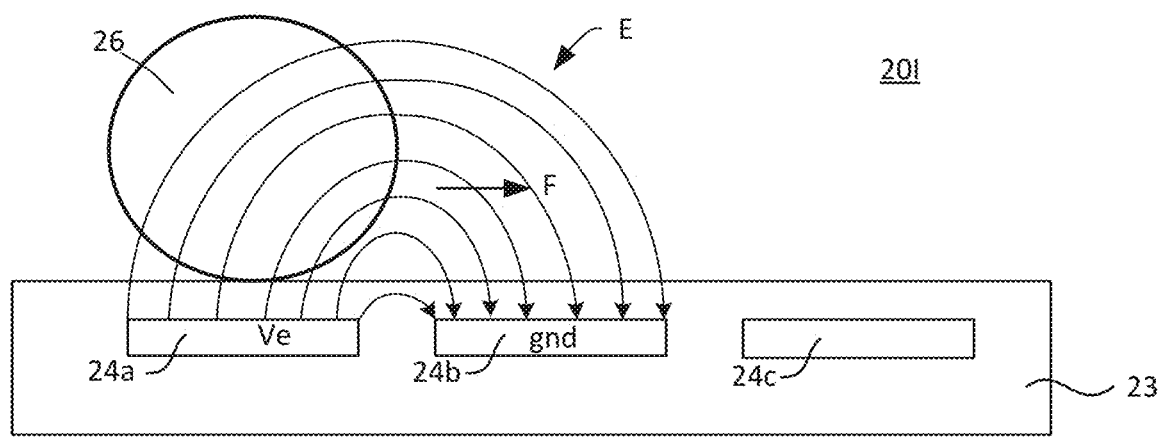
FIG. 2I is a simplified cross-sectional view illustrating electric fields generated by electrodes according to yet another embodiment of the present disclosure.

FIG. 2I is a simplified cross-sectional view illustrating electric fields 291 generated by electrodes according to another embodiment of the present disclosure. Referring to FIG. 2I, a control circuit (not shown) may apply DC or AC voltages to the electrodes 24a, 24b, and 24c in a time-sequential manner to generate electric field patterns that control the movement of the droplet 26. In this embodiment, the electrodes 24a, 24b, and 24c may be operative alternatively as actuation electrodes and common electrodes. The half-cylindrical field is formed between the electrodes 24a and 24B. Referring to FIGS. 2G, 2H, and 2I, the electric field E and the resulting electric force F are a function of the voltage difference between the electrodes and the size of the electrodes. By varying the voltage difference between adjacent electrodes in a time-sequential manner, an electric field and the resulting force are generated causing the transport of the droplet 26 along the direction of the electric force. In some embodiments, the not active electrodes (e.g., electrode 24c), which do not contribute to the movement (or transport) of the droplet, can be left floating, i.e., not connected. In the example shown in FIG. 2I, the droplet 26 will stay between the electrodes 24a and 24b, i.e., between the voltage Ve and ground.

Figure 3A:
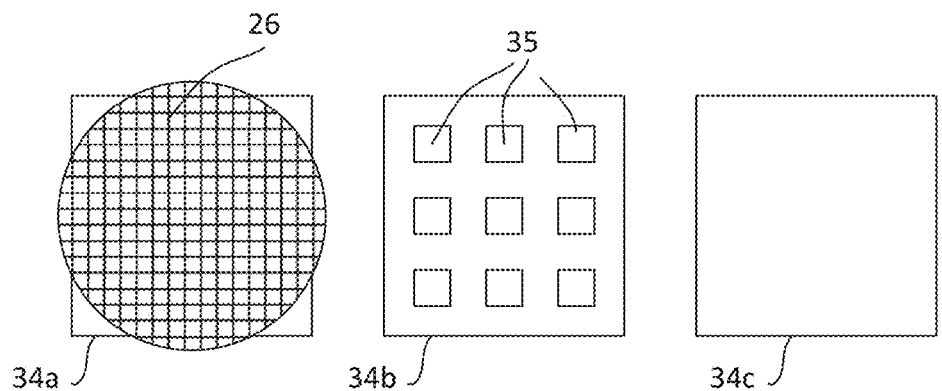
FIGS. 3A to 3C are simplified top views of a droplet moving across a surface of a dielectric layer according to embodiments of the present disclosure.
Figure 3B:
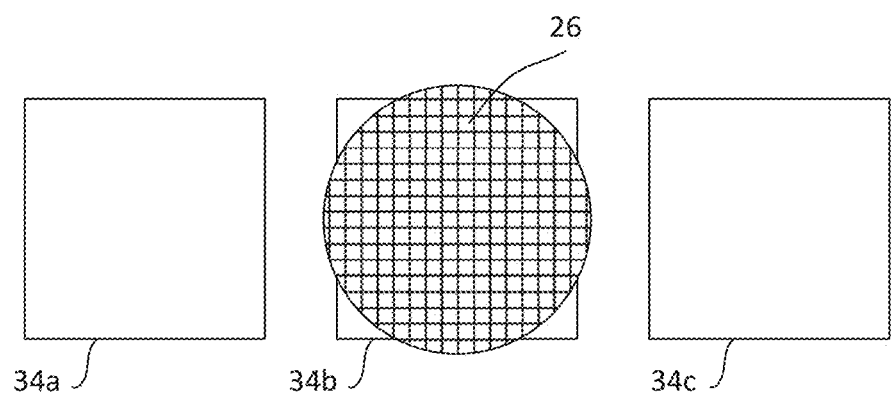
Figure 3C:
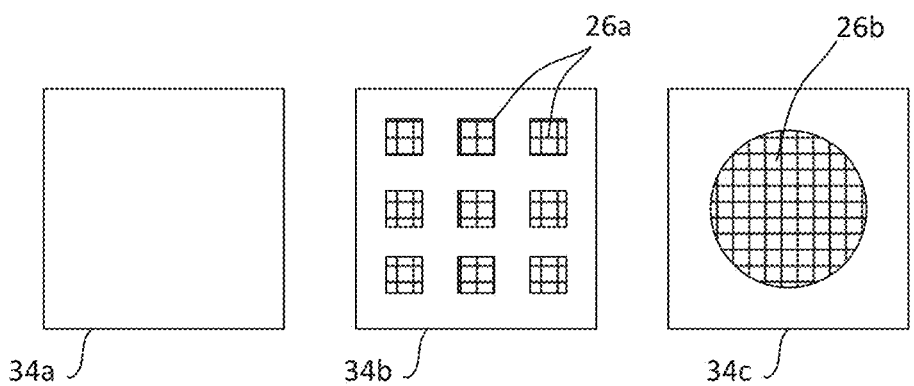

FIGS. 3A to 3C are top sequential views of a droplet moving across a surface of a dielectric layer according to an embodiment of the present disclosure. Referring to FIG. 3A, a droplet 26 is disposed on an EWOD device as described above in any of the EWOD devices 20A, 20B, and 20C. The EWOD device includes a substrate having an array of thin-film transistors or MOS circuitry, a dielectric layer on the substrate, and an array of actuation electrodes (and/or common electrodes) within the dielectric layer, the actuations electrodes and the common electrodes are connected to a control circuit through conductive wirings in the routing channels and receive control signals from the control circuit via the thin-film transistors. The droplet 26 is disposed on a surface of the dielectric layer above a first actuation electrode 34a. By turning off (or floating) the first actuation electrode below the droplet and turning on the actuation electrode next to it, the droplet can be moved toward the next electrode. In one embodiment, the surface portion of the dielectric layer above the array of the actuation electrodes can be modified with a predefined feature which has more attraction to a liquid (e.g., the liquid droplet) than a hydrophobic surface. The feature may have a dimension ranging from micrometer to nanometer corresponding to microliter and nanoliter in volume, respectively. The feature 35 may be manufactured on the dielectric layer accurately thousands or million times on the dielectric layer using currently available submicron semiconductor manufacturing processes.

As used herein, turning off an actuation electrode refers to lowering the voltage of that actuation electrode to a level same as a common voltage which is applied to the common electrode. Conversely, turning on an actuation electrode refers to increasing the voltage of that actuation electrode to a level above the common voltage. The EWOD devices can operate with DC (DC electrowetting) or AC (AC electrowetting) voltages as long as a potential between the electrodes is at a DC voltage level to form an electric field for moving the droplet. In certain embodiments, when an adjacent electrode is completely or partially turned on, the droplet disposed adjacent to it will be moved onto that turned-on electrode and wets the features disposed on the turned-on electrode. As used herein, the term "feature" refers to a region or a structure in or on which a liquid material (e.g., a drop) is deposited or formed. By moving the droplet to a next turned-on electrode using a time-varying voltage waveform provided by a control circuit, the droplet will move from electrode to electrode, thereby leaving residual tiny drops (very small or tiny drops or microdroplets) 26a in or on the features. The volume of the residual tiny drops is completely determined by the feature dimension (size) as well as the contact angle of the liquid droplet on the surface in the environment (e.g., air or oil). FIG. 3B is a top view illustrating that the droplet 26 is moving from the first electrode 34a to the second electrode 34b having nine features 35 according to an embodiment of the present disclosure. FIG. 3C is a top view illustrating that the remaining droplet 26b is moving from the second electrode to the third electrode 34c, thereby leaving residual tiny drops (microdroplets) 26a in or on the features, in accordance with an embodiment of the present disclosure. To prevent evaporation of microdroplets in the air, the droplet can be surrounded by other immiscible liquid like silicone oil. It is understood that the number of features on the electrode can be any integer number. In the example shown in FIGS. 3A to 3C, nine features are used in the second electrode. But it is understood that the number is arbitrarily chosen for describing the example embodiment and should not be limiting. It is also understood that each electrode (e.g., first, second, third electrodes) may have the same number of features, or they may have different number of features. Referring to FIGS. 3A to 3C, the features are shown to have a square shape, however, it in understood the shown shape is not limiting and any other shapes are equally suitable such as circular, rectangular, oval, elliptic, polygonal, and other shape.

It is noted that the electrodes according to embodiments of the present disclosure can be arranged in various configurations and the electrodes can have many shapes. For example, the electrodes can have a polygonal shape (e.g., square, rectangular, triangular, and the like), a circular shape, an oval shape, etc. The configuration can be a checker-board configuration, or other geometric configurations.

Figure 4A:
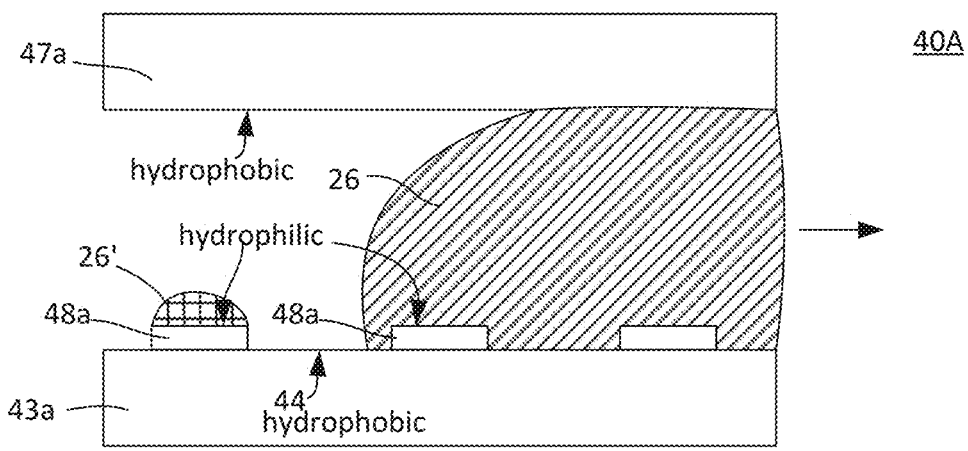
FIG. 4A is a cross-sectional view of a portion of an EWOD device according to an embodiment of the present disclosure.

The patterned features can be implemented in different ways. In one embodiment, the surface of the dielectric layer is selectively partitioned into hydrophobic regions and hydrophilic regions. Within a certain range of a surface area ratio between the hydrophobic regions and hydrophilic regions, and as well as the interfacial tension between a droplet and the environment (oil or air), the droplet can be moved away from the hydrophobic regions while leaving residual small drops (microdroplets) in the hydrophilic regions. The volume of a residual small drop (microdroplet) is defined by the dimension of a hydrophilic feature as well as the contact angle of the droplet on the surface in the environment (air or oil). FIG. 4A is a cross-sectional view of a portion of an EWOD device 40A according to an embodiment of the present disclosure. Referring to FIG. 4A, the EWOD device 40A includes a substrate structure having a first substrate (not shown) with a first dielectric layer 43a disposed thereon and a second substrate (not shown) with a second dielectric layer 47a disposed thereon. A droplet 26 is disposed between the first dielectric layer 43a having a first surface 44 and the second dielectric layer 47a having a second surface facing the first surface. In one embodiment, the first surface of the first dielectric layer includes a plurality of hydrophilic regions 48a that protrude above the surface of the first dielectric layer 43a. The surface of the first dielectric layer 43a is coated with a hydrophobic film, i.e., the protruding hydrophilic regions 48a are surrounded by an interstitial hydrophobic surface region. The protruding hydrophilic regions 48a may be arranged in a pattern such that a residual small droplet (microdroplet) of the droplet disposed on each of the hydrophilic regions has a desired volume. The protruding hydrophilic regions each may have a polygonal shape (e.g., square, rectangular), oval, circular, elliptic, and other shapes. The term "protruding hydrophilic region" may also be referred to as a "spot" or "island" in the present disclosure. In some embodiments, the second dielectric layer 47a is made of glass that is coated with a hydrophobic film. In some embodiments, the first dielectric layer and the second dielectric layer are formed separately, and a spacer such as the one shown and described in FIGS. 2A, 2C, 2D, and 2E is formed either on the first dielectric layer or on the second dielectric layer. The first and second dielectric layers are then bonded together to form the structure shown in FIG. 4A having a space therebetween operative as a channel for the droplet 26. In some embodiments, the second dielectric layer 47a is coated with an electrical conducting layer of a metal material that serves as a common electrode (e.g., ground electrode) and a hydrophobic film on the conducting layer. In some embodiments, the second dielectric layer may include a plurality of sensors as shown and described in FIGS. 2D and 2E. The protruding hydrophilic regions may be formed on the surface of the first dielectric layer 43a using conventional semiconductor manufacturing techniques. Some of these semiconductor manufacturing techniques will be described in detail in the example section further below. The EWOD 40A also includes an array of electrodes (not shown) embedded within the first dielectric layer, the second dielectric layer, or in both first and second dielectric layers that generate a moving electric field in response to time-sequentially varying voltages provided by a control circuit. The droplet 26 is moved by the moving electric field across the surface of the first dielectric layer while leaving residual small portions (microdroplets) 26' of the droplet 26 on the protruding hydrophilic regions 48a.

Figure 4B:
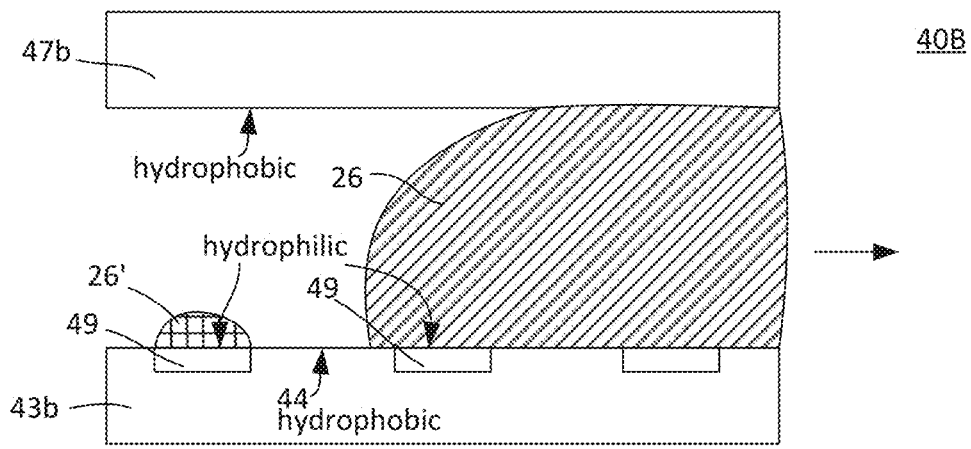
FIG. 4B is a cross-sectional view of a portion of an EWOD device according to another embodiment of the present disclosure.

FIG. 4B is a cross-sectional view of a portion of an EWOD device 40B according to another embodiment of the present disclosure. Referring to FIG. 4B, the EWOD device 40B includes a substrate structure that is similar to the substrate structure shown in FIG. 4A with the difference that the first dielectric layer 43b includes a plurality of grooves (microwells) 49 having a certain depth instead of the protruding regions. In one embodiment, the second surface of the second dielectric layer is hydrophobic, and the first dielectric layer includes a plurality of grooves (microwells) 49 having a certain depth. The terms "grooves," "recesses," and "microwells" are used interchangeably herein. Each of the grooves also have an opening determined by a length and a width. In some embodiments, the length and the width are less than 1 micron. By carefully choosing the shape of microwells or/and alter the inside surface (sidewalls and/or bottom) of the microwells from hydrophobic to hydrophilic chemically (i.e., by surface treatment) or electrically (i.e., by electrowetting), a portion of the aqueous droplet would spontaneously wet into a microwell and has tendency to stay inside the microwell even after the electrical field has been removed. Within a certain range of the area ratio between the flat hydrophobic surface of the first dielectric layer and the microwells as well as the interfacial tension between the droplet and environment (oil or air), the droplet can be moved away from the microwells while leaving (depositing) residual small droplets (microdroplets) inside the microwells. The volume of residual small droplets (microdroplets) is determined by the predetermined microwell dimension and contact angle of the droplet on the opening of the microwell. Similar to the structure described above in connection with FIG. 4A, the second dielectric layer 47b may be coated with an electrical conducting layer of a metal material that serves as a common electrode (e.g., ground electrode) and a hydrophobic film on the conducting layer. The recessed hydrophilic regions may be formed in the first dielectric layer 43b using conventional semiconductor manufacturing techniques. The EWOD 40B also includes an array of electrodes (not shown) embedded within the first dielectric layer, the second dielectric layer, or in both first and second dielectric layers that generate a moving electric field in response to time-sequentially varying voltages provided by a control circuit (not shown). The droplet 26 is moved by the moving electric field across the surface of the first dielectric layer while leaving residual small portions (microdroplets) 26' of the droplet 26 on the surface of the microwells. In some embodiments, an array of microwells can be obtained using lithographically patterning and etching processes. Some of these semiconductor manufacturing techniques will be described in detail in the example section further below.

Figure 4C:
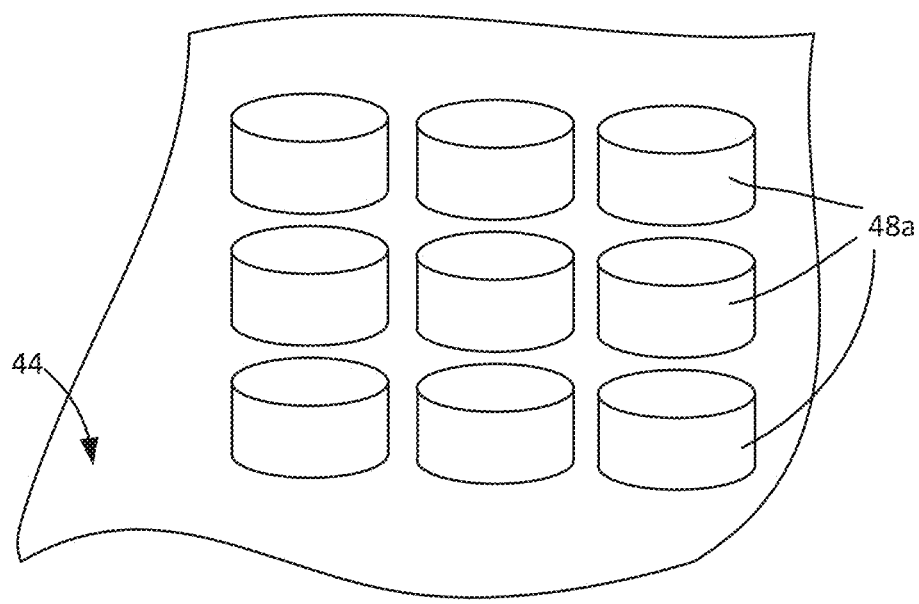
FIG. 4C is a perspective view of a portion of an EWOD device shown in FIG. 4A.

FIG. 4C is a perspective view of a portion of an EWOD device 40A shown in FIG. 4A. Referring to FIG. 4C, a set of round cylindrical spots (protruding hydrophilic regions) 48a are arranged in an array. As used herein, the terms "spots," "islands," "protruding regions" are interchangeably used. The spots 48a are spaced apart and isolated from each other by an interstitial hydrophobic surface 44. It is noted that, although the spots 48a are shown having round cylindrical shape in the example shown, those of skill in the art will appreciate that the spots 48a may also have other shapes, such as rectangular, square, or oval cylindrical shape.

Figure 4D:
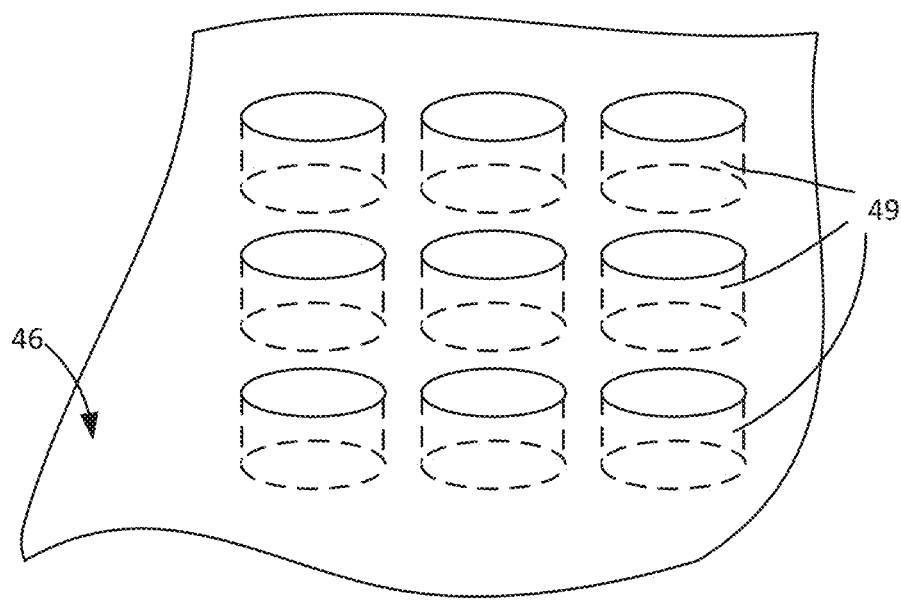
FIG. 4D is a perspective view of a portion of an EWOD device shown in FIG. 4B.

FIG. 4D is a perspective view of a portion of an EWOD device 40B shown in FIG. 4B. Referring to FIG. 4D, a set of round cylindrical grooves (microwells) 49 are arranged in an array. The microwells 49 are filled with a hydrophobic material and spaced apart from each other by an interstitial hydrophobic surface 46. In some embodiments, the hydrophobic material filling the microwells 49 has an upper surface flush with an upper surface of the interstitial hydrophobic surface 46. It is noted that, although the microwells 49 are shown as round cylindrical wells, the microwells 49 may also be rectangular, square, or oval cylindrical wells depending upon applications.

Figure 4E:
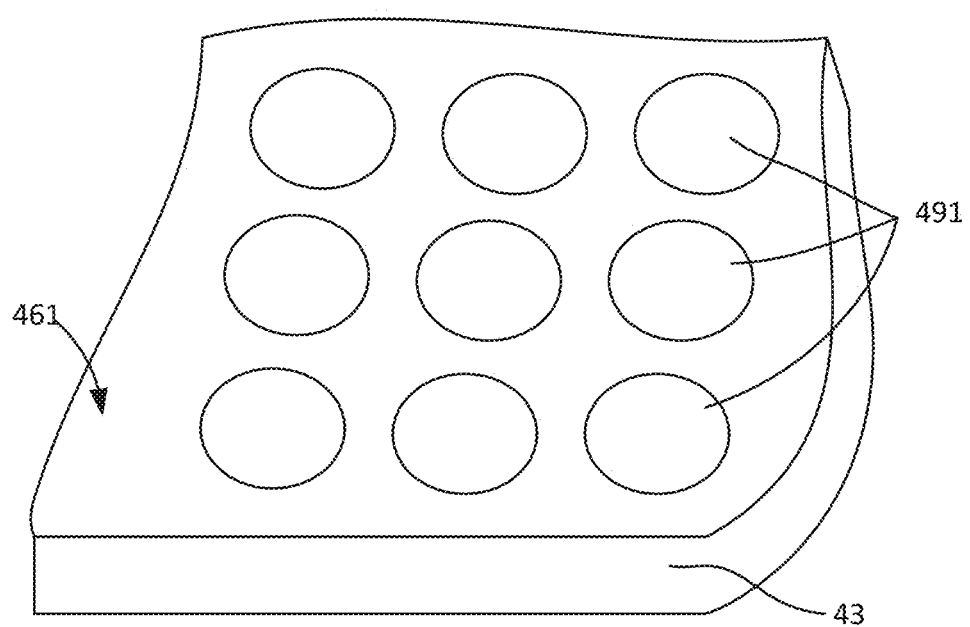
FIG. 4E is a perspective view of a portion of an EWOD device according to an embodiment of the present disclosure.

FIG. 4E is a perspective view of a portion of an EWOD device according to an embodiment of the present disclosure. Referring to FIG. 4E, a set of hydrophilic surfaces 491 is surrounded (flanked) by hydrophobic interstitial regions 461 on the surface of the dielectric layer 43, i.e., the hydrophilic surfaces 491 are flush with the surface of the hydrophobic interstitial regions 461 on the surface of the dielectric layer 43.

In accordance with the present disclosure, the large number of microdroplets having a uniform size can be used to perform droplet digital PCR on a microfluidic chip. With a small volume of each sample and below certain DNA concentration meeting the Poisson distribution requirement, each sample of the droplet (microdroplet) would have either one DNA molecule or no DNA molecule. By thermo-cycling the samples (microdroplets) with a conventional PCR or incubating them under a certain temperature with an isothermal PCR, a single DNA molecule within a target region can be amplified on each sample within the environment (e.g., oil). After reading the final droplet's DNA concentration by optical detection or pH measurement through integrated on-chip ion-sensitive field-effect transistor (ISFET) sensors, we can quantify the absolute numbers of a targeted DNA in the array of samples (microdroplets) and then use the absolute DNA quantification to calculate the DNA concentration in the bulk droplet. The terms "sample," "residual small droplet," "small portions of the droplet," and "microdroplet" are used interchangeably herein and refer to a small droplet formed from a bulk droplet according to embodiments of the present disclosure.

In accordance with the present disclosure, a droplet containing multiple different DNA targets can be dispensed on a region of a single microfluidic chip, the droplet is then moved by electrowetting to a next region which produces a multitude of samples (copies of the DNA targets) from the droplet for detection or measurement of the samples. In some embodiments, the next region where the droplet is moved to may include a plurality of hydrophilic regions spaced apart by an interstitial hydrophobic surface. The plurality of hydrophilic regions may be the one shown and described in connection with FIGS. 4A and 4B. Each of the hydrophilic regions may include an ion-sensitive field-effect transistor (ISFET) sensor configured to measure a pH value of the samples disposed thereon. That is, the single microfluidic chip may include an array of ISFET sensors each being associated with one of the samples of the droplet. This arrangement of the single microfluidic chip enables the formation of a plurality of samples (microdroplets) from a droplet by electrowetting and the measurement of the samples by an array of ISFET devices that are integrated on-chip. In accordance with the present disclosure, the array of ISFET sensors embedded in the hydrophilic regions facilities a concurrent measurement of different targets from a droplet with high sensitivity and accuracy.

Figure 5:
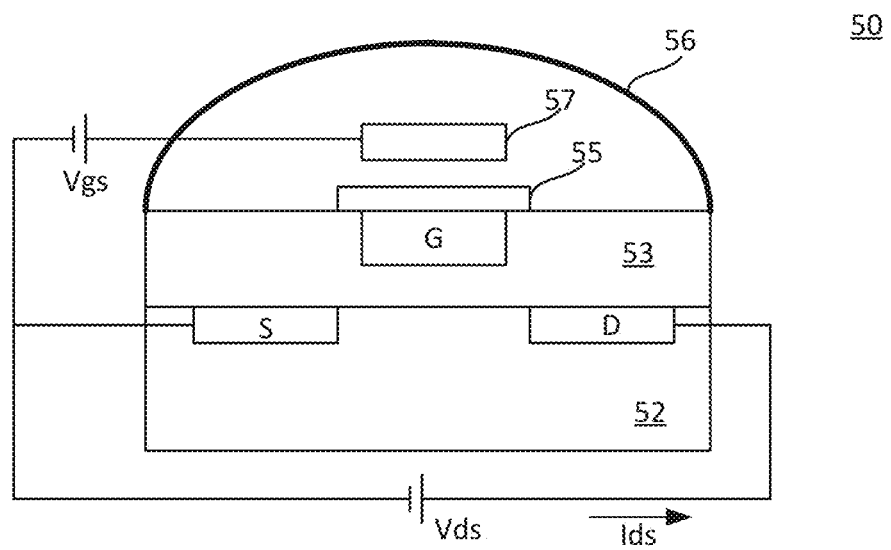
FIG. 5 is a cross-sectional view of an ISFET device according to an embodiment of the present disclosure.

FIG. 5 is a cross-sectional view of an ISFET device 50 according to an embodiment of the present disclosure. Referring to FIG. 5, the ISFET device 50 is a metal oxide semiconductor (MOS) transistor, which can be a p-channel MOS field effect transistor (MOSFET) or an n-channel MOSFET transistor that is manufactured using standard CMOS manufacturing processes. In the following description, an n-channel MOS transistor (NMOS) transistor is used according to an exemplary embodiment of the present disclosure. However, it should be noted that the selection of NMOS or PMOS is merely a choice depending upon a chosen process or substrate, and is not limiting. Referring to FIG. 5, the ISFET device 50 has a substrate 52, a source region S and a drain region D formed in the substrate, a dielectric layer 53 on the substrate, and a floating gate G formed within or on the dielectric layer 53. The ISFET device further includes a sensing membrane 55 on the floating gate G and below a microdroplet 56, and a reference electrode 57 entirely or partially immersed in the microdroplet 56 and spaced apart from the sensing membrane 55. The sensing membrane may include any material that provides sensitivity to hydrogen ion concentration (pH), such as silicon nitride, silicon oxynitride, and the like. As known to those of skill in the art, other sensing membranes may be used that are sensitive to other ions.

Still referring to FIG. 5, the ISFET device 50 also includes a voltage source Vgs configured to provide a voltage Vgs between the sample and the source region S, a voltage source Vds configured to provide a voltage Vds between the source region and the drain region. When the voltage Vgs is greater than the threshold voltage Vth of the ISFET device, the channel between the source and drain regions will conduct current. The amount of current Ids flowing between the source region and the drain region represents a concentration or a pH value of the sample 56. In one embodiment, the source region and the substrate have the same potential, e.g., ground potential.

In the example shown in FIG. 5, one ISFET device is used for measuring ion concentration of the microdroplet 56. But it is understood that the number is only chosen for describing the example embodiment and should not be limiting. In some embodiments, more than one ISFET device may be used for measuring ion concentration of the microdroplet 56. In other words, each spot or microwell can have a number of ISFET devices.

In some embodiments, each spot of the array of spots or each microwell of the array of microwells shown in respective FIGS. 4C and 4D may have more than one ISFET device to increase the measurement sensitivity and accuracy. The number of ISFET devices available for each spot or microwell depends from conventional CMOS manufacturing processes and application requirements. Power supply voltages supplied to the ISFET devices through electrical connections may be implemented using conventional CMOS manufacturing processes and will not be described herein for the sake of brevity. In some embodiments, the ISFET devices may be integrated onto the second substrate 28d and 28e as sensors, as shown in FIGS. 2D and 2E, respectively.

Figure 1B:
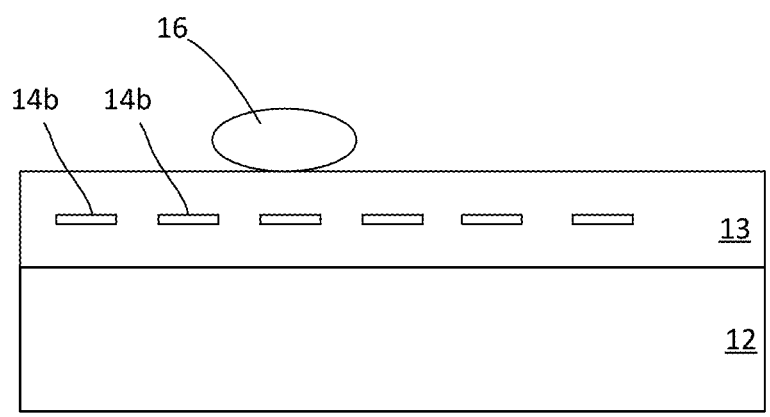
FIG. 1B is a simplified cross-sectional view of the EWOD device shown in FIG. 1A taken along the line B-B'.
Figure 6A:
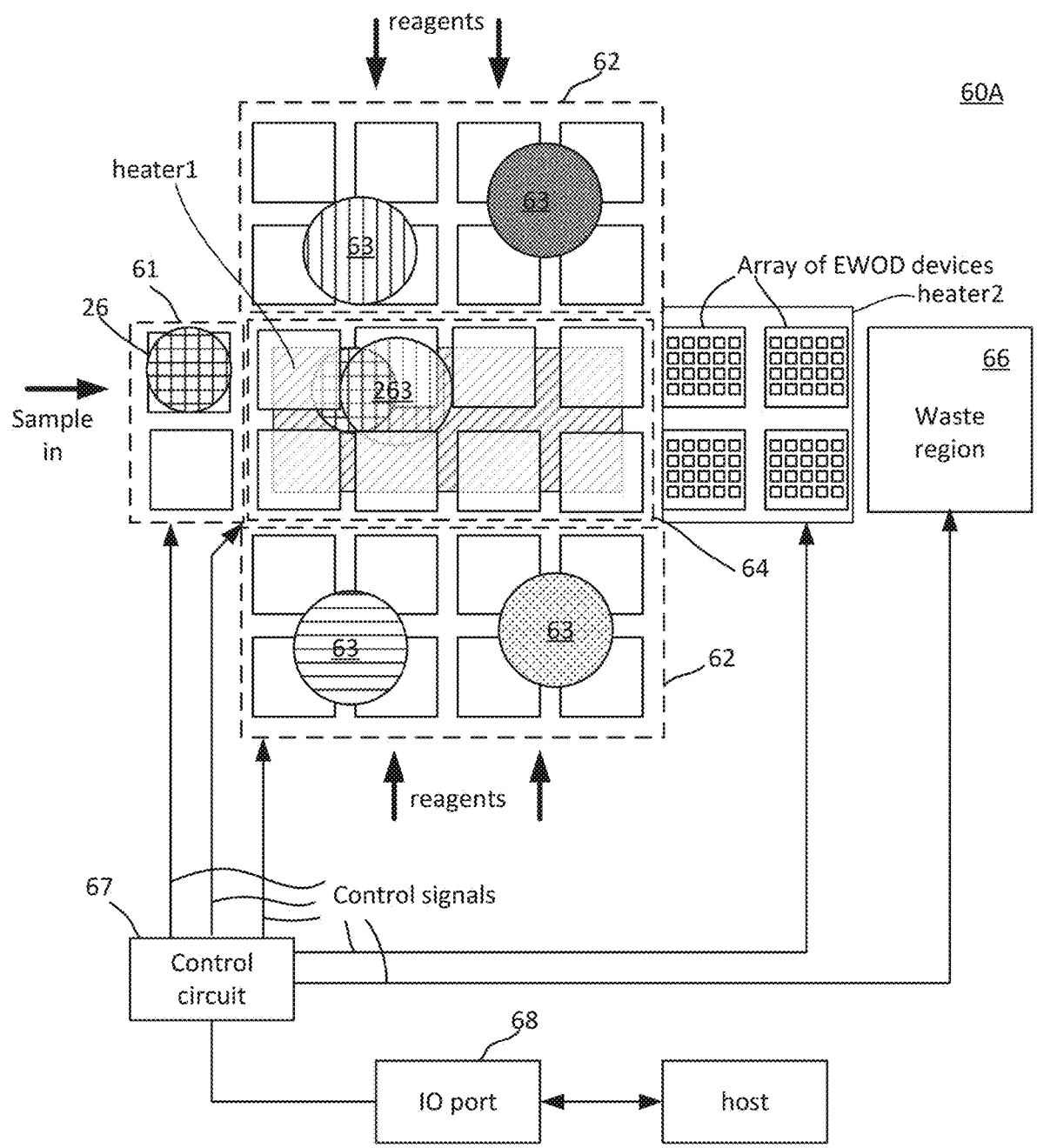
FIG. 6A is a simplified top view of an integrated lab-on-a-chip device according to an embodiment of the present disclosure.

FIG. 6A is a simplified top view of an integrated lab-on-a-chip device 60A according to an embodiment of the present disclosure. Referring to FIG. 6A, the integrated lab-on-a-chip device 60A includes a substrate structure having a droplet receiving region 61 configured to receive one or more droplets 26, a reagent receiving region 62 configured to receive one or more reagents 63, a mixing region 64 configured to mix the droplet 26 with the one or more reagents 63 to obtain a mixed droplet 263, and an array of EWOD devices configured to partition a droplet (mixed or not mixed) into a plurality of microdroplets and amplify the microdroplets. In one embodiment, the array of EWOD devices may feature first heating elements configured to heat the microdroplets to a first temperature for amplification of the microdroplets and second heating elements for annealing the amplified microdroplets. In one embodiment, the lab-on-a-chip device 60 may further include an array of sensors each being associated with a sample and configured to measure a concentration or a pH value of the microdroplets. In one embodiment, the droplet receiving region 61 may have the device structure shown in FIGS. 1A and 1B. In one embodiment, the reagent receiving region 62 may have the device structure shown in FIGS. 1A and 1B. In other words, the integrated lab-on-a-chip device 60 may be operable to move the one or more droplets and the one or more reagents toward the mixing region 64 and control the mixing of the droplets with the reagents according to a user provided software program. In one embodiment, the array of EWOD devices may include a plurality of EWOD devices arranged in a regular pattern, each of the EWOD devices may have the structure similar or the same as the device structure shown in FIGS. 2A to 2C. In some embodiments, each of the EWOD devices may include a plurality of ISFETs. An example of an ISFET device is shown in FIG. 5. The integrated lab-on-a-chip device 60A may further include a waste (collection) region 66 for collecting the residual portion of the droplet after the microdroplets have been formed in the array of EWOD devices and/or the microdroplets after they have been processed and measured. In the example shown in FIG. 6A, two electrodes are used in the droplet receiving regions 61, eight electrodes are used in the upper portion of the reagent receiving region 62, eight electrodes are used in the lower portion of the reagent receiving region 62, eight electrodes are used in the mixing region 64, and an array of four EWOD devices are used. But it is understood that these number are arbitrary chosen for describing the example embodiment and should not be limiting.

In some embodiments, the integrated lab-on-a-chip device 60A may also include a control circuit 67 configured to provide control signals to the droplet receiving region 61, the reagent receiving region 62, the mixing region 64, the array of EWOD devices, and the waste region 66 for moving the droplet 61, the reagents 63, the mixed droplet 263, the partitioned droplet (i.e., microdroplets) and the residual portion of droplet after passing through the array of EWOD devices. In one embodiment, the integrated lab-on-a-chip device 60A may include an input/output (IO) port 68 configured to interface with a host. In one embodiment, the host may be a separate or external processor configured to provide control signals to the integrated lab-on-a-chip device 60. In another embodiment, the host may be integrated with the integrated lab-on-a-chip device 60 in a same package. One of ordinary skill in the art would recognize many variations, modifications, and alternatives. Referring still to FIG. 6A, the control circuit 67 may be disposed remotely from the integrated lab-on-a-chip device 60A and communicates with the integrated lab-on-a-chip device 60A via an input-output port or a serial interface port. In one embodiment, the integrated lab-on-a-chip device 60A may include a sample inlet for receiving a liquid sample and delivering the sample onto the droplet receiving region 61. The integrated lab-on-a-chip device 60A may include a reagent inlet for receiving one or more reagents and one or more reservoirs in the reagent receiving region 62 for storing the received reagents. In one embodiment, the integrated lab-on-a-chip device 60A may also include a first heating block "heater 1" formed within the substrate structure below the surface of the mixing regions 64 for maintaining and/or varying an incubation temperature for the mixed droplet 263. In one embodiment, the integrated lab-on-a-chip device 60A may further include a second heating block "heater 2" formed within the substrate structure below the surface of the array of EWOD devices for maintaining and/or varying an incubation temperature for the microdroplets. The first and second heating blocks are formed of metal or polysilicon wires, metal or polysilicon layer(s), polysilicon layer(s) that can convert an electric energy of signals received from the control circuit 67 into a thermal energy. All these operations of receiving a droplet, mixing the droplet with reagents, heating the droplet, partitioning the droplet into multiple microdroplets, testing the microdroplets and discarding the microdroplets after being tested are collectively referred to as manipulating a droplet in this disclosure.

Figure 6B:
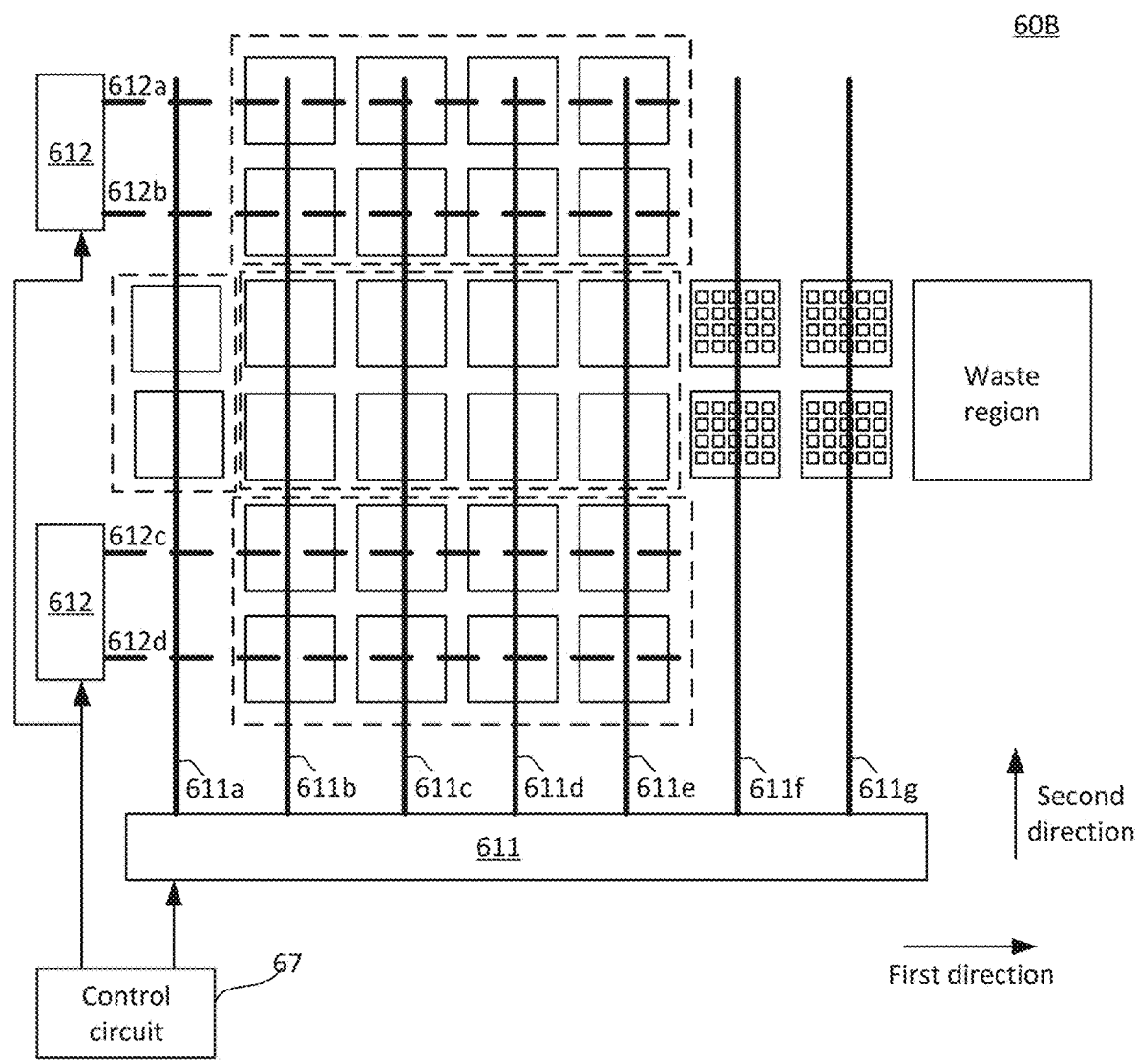
FIG. 6B is a simplified top view of an example arrangement of electrodes of an integrated lab-on-a-chip device according to an embodiment of the present disclosure.

FIG. 6B is a simplified top view of an example arrangement of electrodes 60B of the integrated lab-on-a-chip device 60B according to an embodiment of the present disclosure. Referring to FIG. 6B, the electrodes 60B of the integrated lab-on-a-chip device of FIG. 6A includes a first array of electrically conductive stripes 611 having, e.g., stripes 611a, 611b, 611c, 611d, 611e, 611f, and 611g arranged in parallel to each other along a first direction from the first region (the droplet receiving region) toward the third region (the array of EWOD devices). The first array of stripes 611 is controlled by a control circuit 67 and configured to generate moving electric fields to transport the droplet along the first direction. The electrodes 60B also includes a second array of parallel stripes 612 having, e.g., stripes 612a, 612b, 612c, 612d, arranged in parallel to each other along a second direction perpendicular to the first direction. The second array of stripes 612 is configured to generate moving electric fields to transport the droplet along the second direction toward the second region (the mixing region). The first array of stripes intersect the second array of stripes and are spaced apart from the second array of stripes by an insulating layer, i.e., the first and second arrays of stipes are arranged in different layers separated by at least one insulating layer. In the example shown in FIG. 6B, the second array of stripes 612 are arranged in the reagent receiving region for transporting the reagents toward the mixing region. But it is understood that the second array of stripes 612 can also be arranged in the droplet receiving region, in the mixing regions, and in the array of EWOD devices to generate moving electric fields and electric forces to move the droplet, the mixed droplet, and the microdroplets along the second direction. In some other embodiments, the electrodes 60B may include an array of electrodes similar to the one shown and described in connection with FIGS. 1A and 1B. One of ordinary skill in the art would recognize many variations, modifications, and alternatives.

Figure 7A:
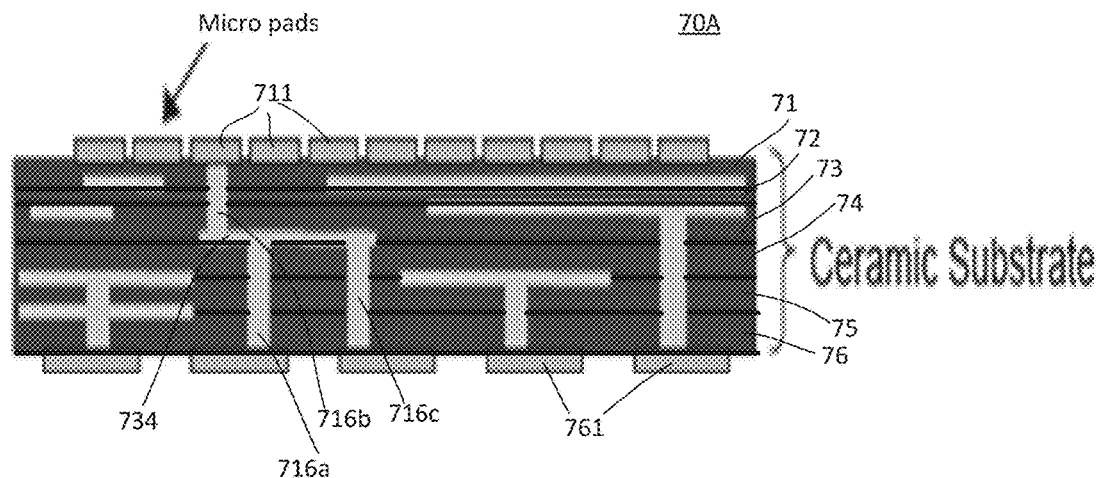
FIG. 7A is a simplified cross-sectional view illustrating a multilayer ceramic substrate that can be used as an EWOD according to an embodiment of the present disclosure.

FIG. 7A is a simplified cross-sectional view illustrating a multilayer ceramic substrate 70A according to an embodiment of the present disclosure. Referring to FIG. 7A, multilayer ceramic substrate 70A is a laminated structure including a plurality of layers 71, 72, 73, 74, 75, and 76. The multilayer ceramic substrate 70A has a plurality of micro pads 711 disposed on a first surface of first layer (top layer) 71 and a plurality of contact pads 761 disposed on a second surface of second layer (bottom layer) 76. The first surface and the second surface are opposite to each other. The multilayer ceramic substrate 70A also includes a plurality of vias 716 that pass through the first layer 71, inner layers 72 to 75 and second layer 76 configured to connect the contacts pads with one or more of the micro pads. The multilayer ceramic substrate 70A may further include interconnection layers disposed between the inner layers. The interconnection layers may be configured to connect some vias together. For example, interconnection layer 734 connects vias 716a, 716b, and 716c together. In one embodiment, micro pads 711 may be configured as an array of drive electrodes and reference electrodes for moving or manipulating a droplet. In one embodiment, control pads 711 may be electrically coupled to a control board that provides electrical signals to the micro pads for manipulating the droplet disposed on the first layer. In one embodiment, the multilayer ceramic substrate 70A may include a glass-ceramic material.

In some embodiments, the layers 71 through 76 may have the same thickness. In other embodiments, the layers 71 through 76 may have different thicknesses. The layers including the interconnection layers and vias may be manufactured concurrently (at the same time) using the same manufacturing processes, or they may be manufactured sequentially using the same process or different processes.

The layers are then assembled (laminated) together under pressure and high temperature to form the multilayer ceramic substrate 70A.

In one embodiment, the multilayer ceramic substrate 70A is configured as an EWOD substrate having the micro pads 711 on the top layer 71 as the drive electrodes and the contact pads on the bottom layer 76 connecting to a control board for providing electrical control signals to the micro pads.

In one embodiment, the micro pads 711 may protrude over the upper surface of the first layer (top layer) 71. In one embodiment, the micro pads 711 may be integrated in the first layer 71 and have an upper surface substantially flush (coplanar) with the upper surface of the first layer 71.

In one embodiment, the top layer 71 may be coated with an inorganic dielectric layer, e.g., silicon dioxide ($SiO_2$), silicon nitride (SiN) or a stack of alternating layers of $SiO_2$ and SiN. In one embodiment, the top layer 71 may be coated with an organic layer such as polyimide. The silicon dioxide and/or silicon nitride may be deposited on the top layer 71 by a silicon vapor deposition, atomic layer deposition, or flowable film deposition process. The organic layer or polyimide layer may be formed by a deposition, coating, or adhesive bonding process. A hydrophobic layer is then formed on the inorganic or organic layer.

Figure 7B:
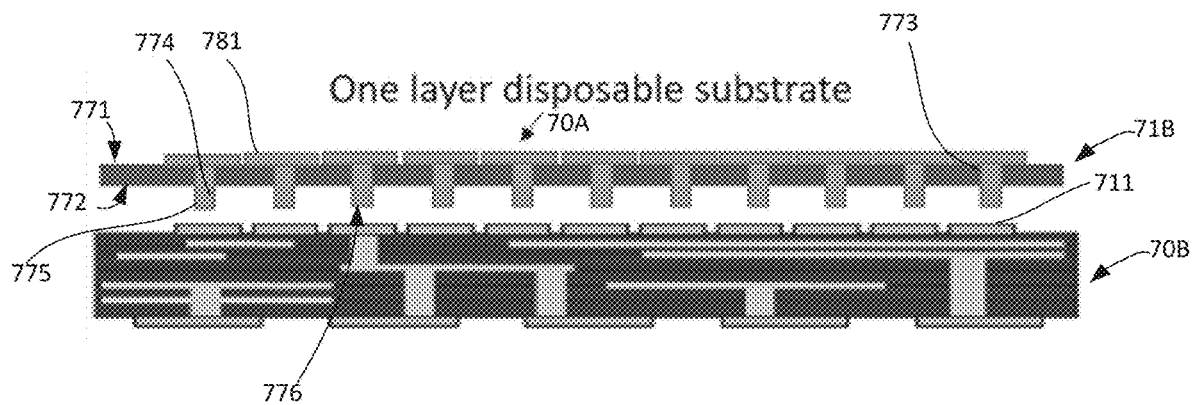
FIG. 7B is a simplified cross-sectional view illustrating a multilayer ceramic substrate configured to function as an interposer substrate for a single-layer substrate according to an embodiment of the present disclosure.

FIG. 7B is a simplified cross-sectional view illustrating a multilayer ceramic substrate 70B configured to function as an interposer substrate for a single-layer substrate 71B according to an embodiment of the present disclosure. Referring to FIG. 7B, the multilayer ceramic substrate 70B may be the same as the multilayer ceramic substrate 70A shown and described above with reference to FIG. 7A. The difference between FIGS. 7A and 7B is that the multilayer ceramic substrate 70B does not operate directly as an EWOD device for manipulating a droplet. Instead, the multilayer ceramic substrate 70B functions as an interposer substrate for the single-layer substrate 71B.

The single-layer substrate 71B is designed to be disposable (i.e., low cost) and has a first surface 771, a second surface 772 opposite the first surface, and a plurality of contact holes 773 extending from the first surface to the second surface and aligned with the micro pads 711 of the multilayer ceramic substrate 70B. The single-layer substrate 71B further includes an array of electrodes 781 disposed on the first surface 771, and a plurality of conductive features 774 filing the contact holes 773. Each of the conductive features includes a raised portion 775 protruding from the second surface 772. In one embodiment, the upper surface surfaces 776 of the raised portions are in a substantially coplanar relation with each other in order to enable a good electrical contact with the micro pads 711. In one embodiment, the first surface 771 of the single-layer substrate 71B may be coated with an inorganic dielectric layer, e.g., silicon dioxide ($SiO_2$), silicon nitride (SiN) or a stack of alternating layers of $SiO_2$ and SiN. In one embodiment, the first surface 771 may be coated with an organic layer such as polyimide. The silicon dioxide and/or silicon nitride may be deposited on the first surface 771 of the single-layer substrate 71B by a silicon vapor deposition, atomic layer deposition, or flowable film deposition process. The organic layer or polyimide layer may be formed by a deposition, coating, or adhesive bonding process. A hydrophobic layer is then formed on the inorganic or organic layer. Because the multilayer ceramic substrate 70B operates as the interposer substrate, the multilayer ceramic substrate 70B can be fixedly or permanently mounted on a test instrument.

Figure 7C:
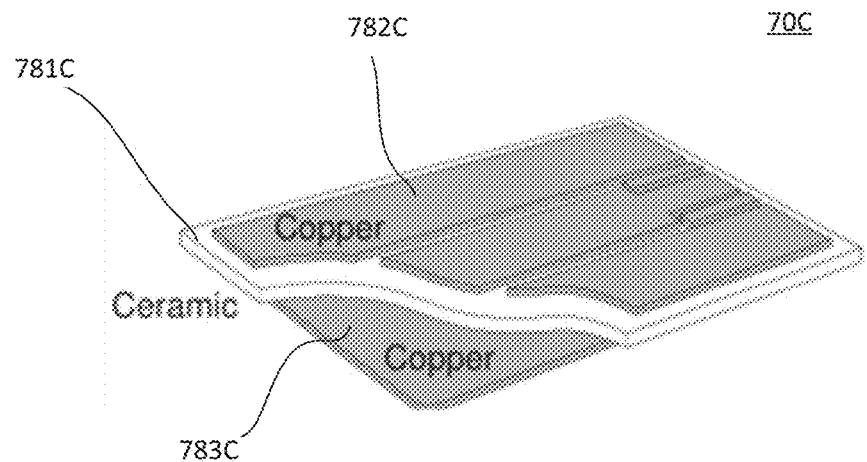
FIG. 7C is a perspective view of an exemplary single-layer substrate according to an embodiment of the present disclosure.

In one embodiment, the disposable single-layer substrate 71B may be a single-layer substrate including a ceramic material. FIG. 7C is a perspective view of an exemplary single-layer ceramic substrate 70C according to an embodiment of the present disclosure. Referring to FIG. 7C, the single-layer substrate 70C includes an insulating layer (e.g., ceramic layer) 781C sandwiched by a first copper layer 782C and a second copper layer 783C.

In one embodiment, the disposable single-layer substrate 71B may be a single-layer substrate including a silicon and/or glass material. In one embodiment, the disposable single-layer substrate 71B may be a single-layer substrate including an organic or plastics material. In the case where the single-layer substrate includes silicon or glass or a combination of silicon and glass, the manufacturing cost may be higher than when the single-layer substrate is made of ceramic, but has the advantages of smoother surface (surface with smaller roughness Ra) and better gap tolerance for a droplet. In other words, a single-layer substrate made of silicon or glass or both has a superior performance over single-layer substrates made of ceramic, organic, or plastics materials. In some embodiments, the single-layer substrate is made of a rigid material suitable to provide a uniform load distribution over the micro pads 711.

Figure 7D:
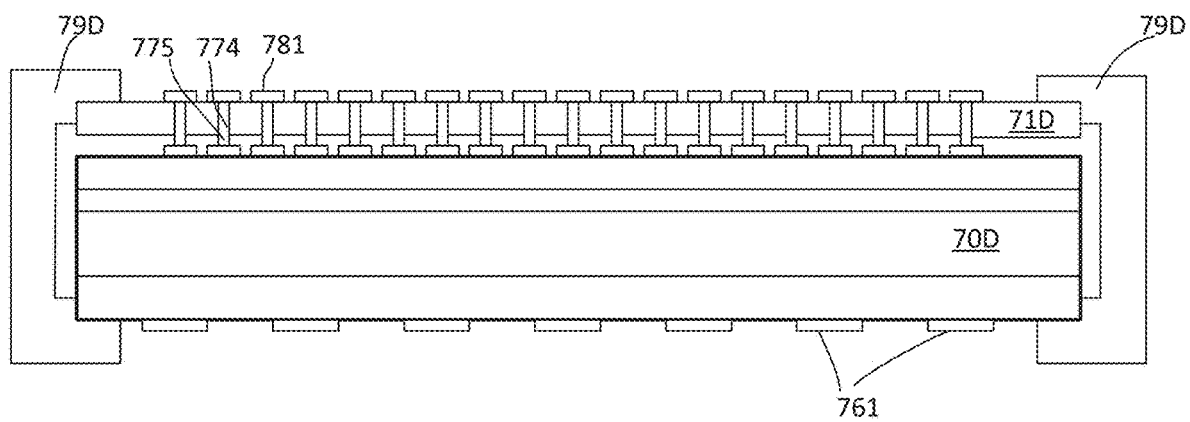
FIG. 7D is a simplified cross-sectional view illustrating a multilayer ceramic substrate coupled to a single-layer substrate by a fastening member according to an embodiment of the present disclosure.

FIG. 7D is a simplified cross-sectional view illustrating a multilayer ceramic substrate 70D connected to a single-layer substrate 71D by a fastening member 79D according to an embodiment of the present disclosure. Referring to FIG. 7D, the multilayer ceramic substrate 70D serving as an interposer between an instrument and the single-layer substrate 71D which serving as an EWOD substrate for manipulating a droplet are mechanically by a mechanical fastening member 79D. The multilayer ceramic substrate 70D may be similar to the interposer substrate 70B described above, and the single-layer substrate 71D may be similar to the single-layer substrate 71B described above. The mechanical fastening member 79C may include a set of clamps, a set of screws and bolts, or other fasteners known in the art.

Figure 8A:
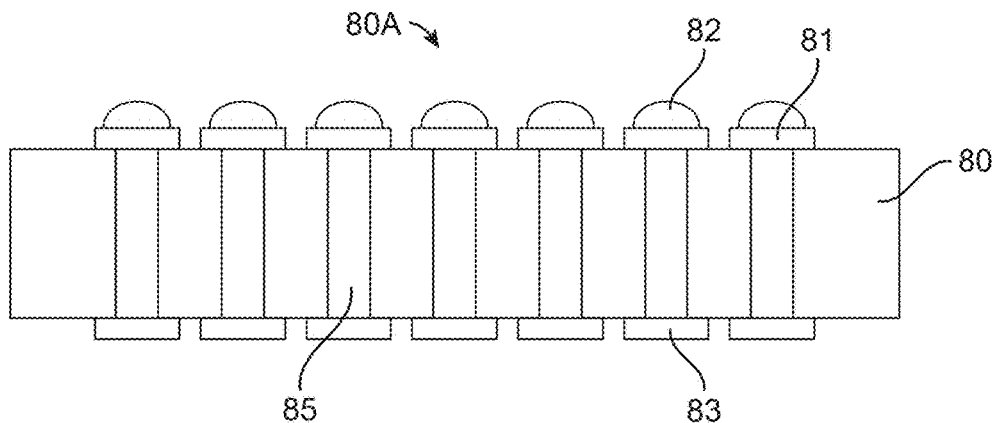
FIG. 8A is a simplified cross-sectional view illustrating a socket for supporting a package of an integrated circuit according to an embodiment of the present disclosure.

FIG. 8A is a simplified cross-sectional view illustrating a socket 80A for supporting a package of an integrated circuit according to an embodiment of the present disclosure. In one embodiment, the socket 80A can function similarly as an interposer substrate between an instrument and a disposable substrate described in connection with the multilayer ceramic substrate 70B as shown in FIG. 7B. Referring to FIG. 8A, the socket 80A may include a socket body 80 having a plurality of upper contact pins 81, a plurality of lower contact pins 83, and a plurality of vias 85 connecting the upper contact pins 81 and the lower contact pins 83. The upper contact pins 81 correspond to the micro pads 711 shown in FIG. 7B, the lower contact pins 83 are configured to interface with pins of a high-density electronic device package, such as a ball grid array or a land grid array. The socket 80A is configured to receive a high-density package that contains an integrated circuit (e.g., a control circuit that provides electrical signals to the disposable substrate for manipulating a droplet). In other words, the conductive features 774 of the disposable substrate 71B in FIG. 7B are aligned with the upper contact pins 81. In one embodiment, the upper contact pins 81 each may include a ball pin 82. In one embodiment, the socket 80A can be mounted with solder to a printed circuit board (e.g., a control board) to serve as an interposer (interconnection) between an instrument and the disposable substrate.

Figure 8B:
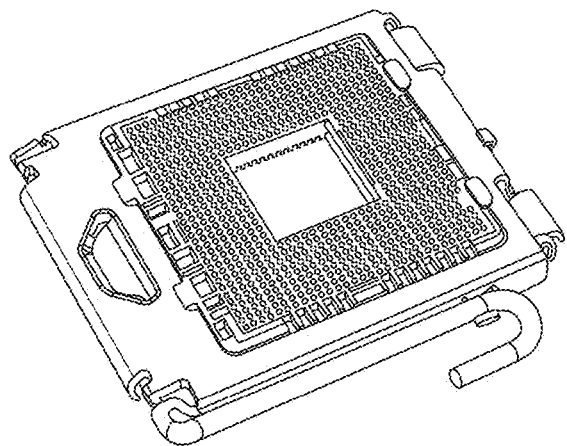
FIG. 8B shows a ball grid array socket that may be used as an interposer (interconnection) between a test instrument and a disposable substrate according to an embodiment of the present disclosure.

FIG. 8B shows an exemplary ball grid array socket that may be used as an interposer (interconnection) between a test instrument and a disposable substrate according to an embodiment of the present disclosure.

Figure 8C:
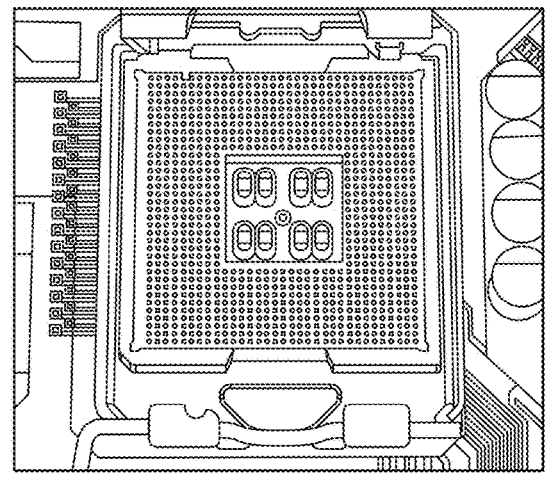
FIG. 8C shows a land grid array socket that may be used as an interposer (interconnection) between a test instrument and a disposable substrate according to an embodiment of the present disclosure.

FIG. 8C shows an exemplary land grid array socket that may be used as an interposer (interconnection) between a test instrument and a disposable substrate according to an embodiment of the present disclosure.

Figure 8D:
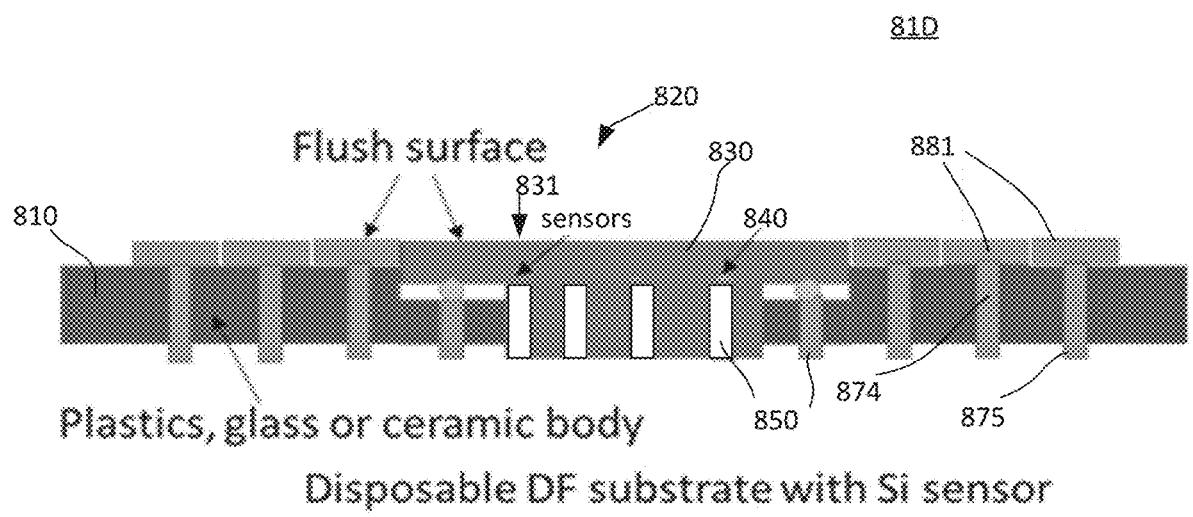
FIG. 8D shows a simplified cross-sectional view illustrating a single-layer substrate including a plurality of sensors according to an embodiment of the present disclosure.

FIG. 8D shows a simplified cross-sectional view illustrating a single-layer substrate 81D including a plurality of sensors according to an embodiment of the present disclosure. The single-layer substrate 81D includes a substrate 810, an array of electrodes 881 disposed on the upper surface of the substrate, each of the array of electrodes includes a conductive feature 874 extending through the substrate and a raised portion 875 protruding from the lower surface of the substrate. The raised portions have upper surfaces that are in substantially coplanar relation with each other. The single-layer substrate 81D further includes a groove 820 configured to receive a porous dielectric layer 830 having a first surface 831 flush with the upper surface of the array of electrodes 881 and a second surface opposite the first surface 831. The single-layer substrate 81D also includes a plurality of sensors 840 in contact with the second surface, a plurality of actuation electrodes 850 configured to generate an electric field to transfer a portion of a droplet through the porous dielectric layer to the sensors for testing or measuring. The sensors may be MOS sensors or FET sensors described in reference to FIG. 5. The array of electrodes 881 and the actuation electrodes 850 are in electrical and physical contact with the micro pads 711 of the interposer substrate 70B of FIG. 7B or the contact pins 81 or contact balls 82 of the chip package carrier 80A of FIG. 8A. In one embodiment, the array of electrodes and the actuation electrodes receive electrical signals through a device that is packaged in a BGA or a LGA which is supported by the carrier 80A.

Figure 9:
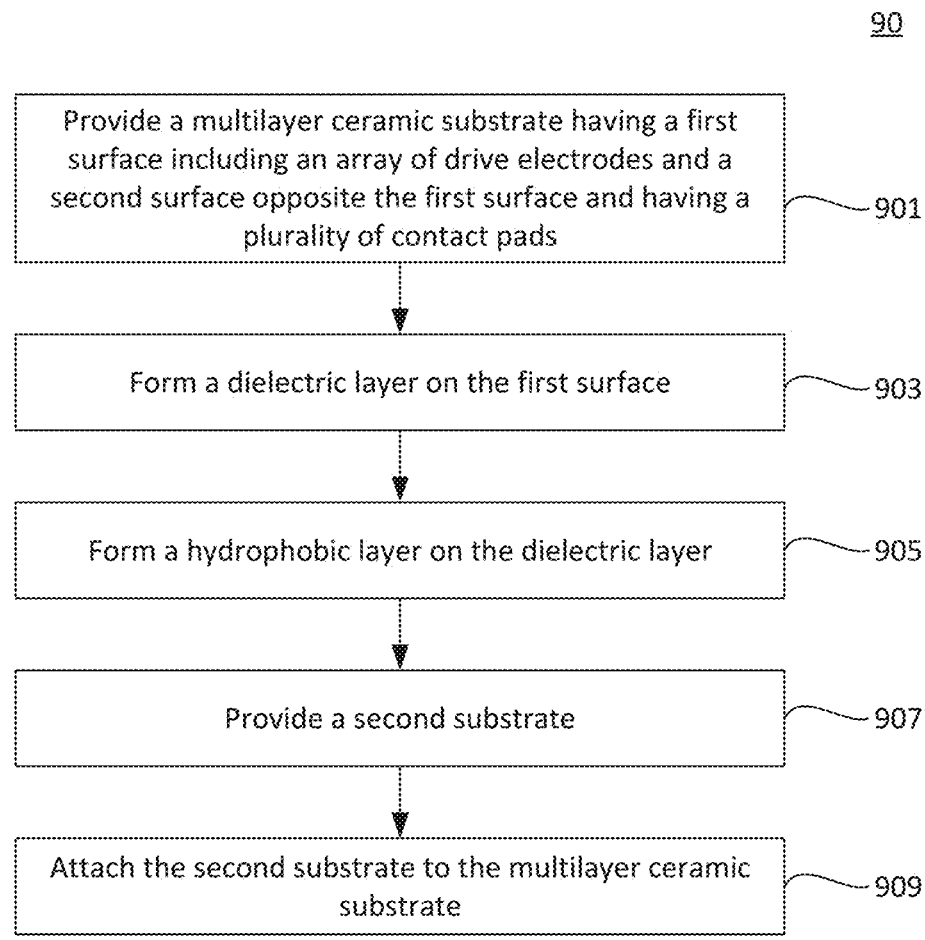
FIG. 9 is a simplified flowchart illustrating a method for manufacturing an apparatus for manipulating a droplet according to an embodiment of the present disclosure.

FIG. 9 is a simplified flowchart illustrating a method 90 for manufacturing an apparatus for manipulating a droplet according to an embodiment of the present disclosure. Referring to FIG. 9, the method 90 may include, at 901, providing a multilayer ceramic substrate having a first surface comprising an array of electrode and a second surface opposite the first surface having a plurality of contact pads in electrical contact with one or more of the drive electrodes. At 903, the method may include forming a dielectric layer on the first surface of the multilayer ceramic substrate. In one embodiment, the dielectric layer may include an inorganic material such as silicon dioxide and/or silicon nitride. In one embodiment, the dielectric layer may include an organic material such as polyimide. In one embodiment, forming the dielectric layer may include a spin coating or adhesive bonding process. At 905, the method may further include forming a hydrophobic layer on the dielectric layer. In some embodiments, the multilayer ceramic substrate thus formed can be directly used to manipulate a droplet. In other embodiments, the method may further include, at step 907, providing a second substrate having a third surface including a plurality of electrodes, a fourth surface opposite the third surface, a plurality of through-holes extending from the third surface to the fourth surface, and a plurality of conductive features filling the through-holes. Each of the conductive features has a raised portion that protrudes over the fourth surface and is aligned with one of the plurality of drive electrodes. In this case, the second substrate is operative to receive the droplet instead of the multiplayer ceramic substrate, which serves as an interposer between a test instrument and the second substrate. In some embodiments, the second substrate is a disposable substrate. In order to keep the costs of the second substrate low, the second substrate is a single-layer substrate. In one embodiment, the second substrate is a single-layer ceramic substrate. In one embodiment, the second substrate includes a dielectric layer and a hydrophobic layer on the dielectric layer. The method may further include, at step 909, attaching the second substrate to the multilayer ceramic substrate using a fastening member, such as clamps, screws and bolts, springs, and the likes.

FIG. 10 is a simplified flowchart illustrating a method 100 for manufacturing an apparatus for manipulating a droplet according to an embodiment of the present disclosure. Referring to FIG. 10, the method 100 may include, at 1001, providing a socket for receiving a package containing an integrated circuit. The socket may include a socket body having a plurality of upper contact pins disposed on a planar upper surface of the socket body, a plurality of lower contact pins on a planar lower surface of the socket body. The lower surface of the socket body may be mounted by solder on a control board. At 1003, the method may also include providing a substrate having a first surface including a plurality of electrodes, a second surface opposite the first surface, a plurality of through-holes extending through the substrate, and a plurality of conductive features filing the through-holes, the conductive features each include an upper portion that protrudes from the second surface, and upper surfaces that are in substantially coplanar relation with each other. The conductive features are substantially aligned with the upper contact pins At 1005, the method may further include attaching the substrate to the socket using a fastening member so that the conductive features are in electrical and physical contact with the upper contact pins of the socket.

Figure 11:
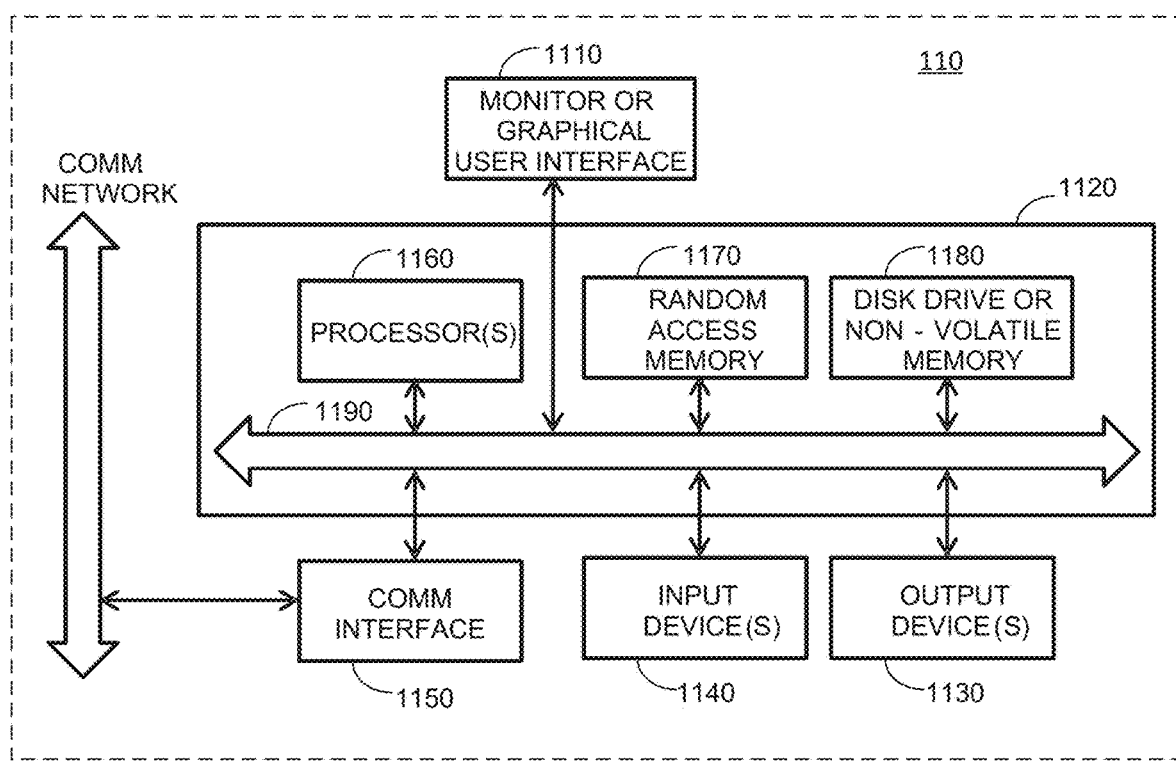
FIG. 11 is a simplified schematic diagram of a mobile computing device that can be used to control the apparatuses or EWOD devices described with reference to FIGS. 1A, 1B, 2A-2I, 3A-C, 4A-B, 5, 6A-B, 7A-D, 8A-C, 9, and 10 according to embodiments of the present disclosure.

FIG. 11 is a simplified schematic diagram of a mobile computing device 110 that can be used to control the apparatuses or devices described with reference to FIGS. 1A-B, 2A-2I, 3A-C, 4A-B, 5, 6A-B, 7A-D, 8A-C, 9, and 10 according to embodiments of the present disclosure. Referring to FIG. 11, the mobile computing device 110 may include a monitor 1110, computing electronics 1120, user output devices 1130, user input devices 1140, a communications interface 1150, and the like.

The computing electronics 1120 may include one or more processors 1160 that communicates with a number of peripheral devices via a bus subsystem 1190. These peripheral devices may include user output devices 1130, user input devices 1140, a communications interface 1150, and a storage subsystem, such as random access memory (RAM) 1170 and a disk drive 1180.

The user input devices 1130 may include all any types of devices and interfaces for inputting information to the computer device 1120, e.g., a keyboard, a keypad, a touch screen, a mouse, a trackball, a track pad, a joystick and other types of input devices.

The user output devices 1140 may include any types of devices for outputting information from the computing electronics 1120, e.g., a display (e.g., monitor 1110).

The communications interface 1150 provides an interface to other communication networks and devices. The communications interface 1150 may serve as an interface for receiving data from and transmitting data to other systems. For example, the communications interface 1150 may include a USB interface for communicating with a device for manipulating a droplet.

The RAM 1170 and the disk drive 1180 are examples of tangible media configured to store data such as embodiments of the present disclosure, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. The RAM 1170 and the disk drive 980 may be configured to store the basic programming and data constructs that provide the functionality of the present invention.

Software code modules and instructions that provide the functionality of the present disclosure may be stored in the RAM 1170 and the disk drive 1180. These software modules may be executed by the processors 1160.

Referring still to FIG. 11, an apparatus for manipulating a droplet may include an interface port configured to provide communications with the mobile computing device 110. In some embodiments, the mobile computing device 110 may provide instructions and control signals via the interface port of the apparatus to control the signal levels of the electrodes in the apparatus. In some embodiments, the apparatus for manipulating a droplet may include a substrate structure as described in one of the FIGS. 2A-2I, 3A-3C, 4A-4E, and one or more of ISFET devices of FIG. 5. The apparatus is configured to receive a droplet and provide a pH value associated with the droplet.

EXAMPLES

The following examples are offered to illustrate, but not to limit the claimed invention.

Example 1

This example discloses the formation of the electrodes within the dielectric layer. In one embodiment, a first dielectric layer is formed on a substrate. A patterned photoresist layer is then formed on the dielectric layer. A metal layer or a doped polysilicon layer is then deposited on the first dielectric layer using the patterned photoresist layer as a mask. The patterned photoresist layer is then removed. Thereafter, a second dielectric layer is formed on the metal layer to form the structure as shown in FIG. 2A to FIG. 2C.

In another embodiment, a first dielectric layer is formed on a substrate. A metal layer is then deposited on the first dielectric layer. Thereafter, a patterned photoresist layer is formed on the metal layer. An etch process is then performed on the metal layer using the patterned photoresist layer as a mask. The patterned photoresist layer is then removed. Thereafter, a second dielectric layer is formed on the metal layer to form the structure as shown in FIGS. 2A to 2C.

Example 2

This example discloses a novel apparatus and method of generating a large array of extremely small drops (microdroplets) having a predetermined volume in the range between nanoliter ($10^{-9}$ liter or nL) and picoliter ($10^{-12}$ liter or pL) from a droplet by electrowetting. The novel apparatus may be the one similar or the same as the EWOD device shown in FIG. 4A or FIG. 4B. The transport mechanism of a dispensed droplet is shown with reference to FIGS. 3A through 3C. The droplet is moved over a surface of a dielectric layer having an array of raised hydrophilic regions (spots) or over a surface of a dielectric layer having an array of microwells each having a hydrophilic bottom and sidewalls. The raised (protruded) hydrophilic regions (spots) and/or the microwells are spaced apart from each other by an interstitial hydrophobic surface. In one embodiment, the raised hydrophilic regions and/or the microwells have a circular or oval shape. In another embodiment, the raised hydrophilic regions and/or the microwells have a polygonal (rectangular, square, hexagonal) shape. In one embodiment, the raised hydrophilic regions (spots) and/or the microwells have a height in the range between 1 nanometer and 100 microns, preferably between 1 micron and 10 microns, and more preferably below 10 nanometers. In one embodiment, the raised hydrophilic regions and/or the microwells have a square shape with a width or length in the range between 1 nanometer and 100 microns, preferably between 1 micron and 10 microns, and more preferably below 10 nanometers. In one embodiment, the raised hydrophilic regions and/or the microwells have a circular shape with a diameter in the range between 1 nanometer and 100 microns, preferably between 1 micron and 10 microns, and more preferably below 10 nanometers.

Example 3

This example discloses a novel apparatus and method of mixing a droplet with one or more reagents and transporting the mixed droplet to an array of EWOD to obtain a plurality of extremely small drops (microdroplets). In one embodiment, the extremely small drops (microdroplets) generated by the novel apparatus and method have a uniform size. The novel apparatus may be an integrated lab-on-a-chip device similar or the same as shown in FIG. 6. In some embodiments, the novel apparatus may include different regions such as a droplet discharge region for receiving a droplet, a reagent discharge region for receiving a reagent, a mixing region for mixing the droplet with the reagent, and an array of IWOD devices for generating a plurality of samples having a uniform size. In one embodiment, the apparatus may also include temperature-regulating elements for performing a conventional PCR or incubate the microdroplets under a predetermined temperature (isothermal PCR). In one embodiment, the IWOD regions each may feature an array of raised (protruding) hydrophilic surface regions or spots (as shown in FIGS. 4A and 4C) or an array of recessed hydrophilic surface regions or microwells (as shown in FIGS. 4B and 4D). In some embodiments, each of the spots or microwells include one or more ISFET for measuring an ion concentration or a pH value of an associated microdroplet. In one embodiment, the apparatus may include an interface port configured to communicate with an external host that collects the measured pH values of the samples and calculate a DNA concentration of the droplet.

Example 4

Figure 12:
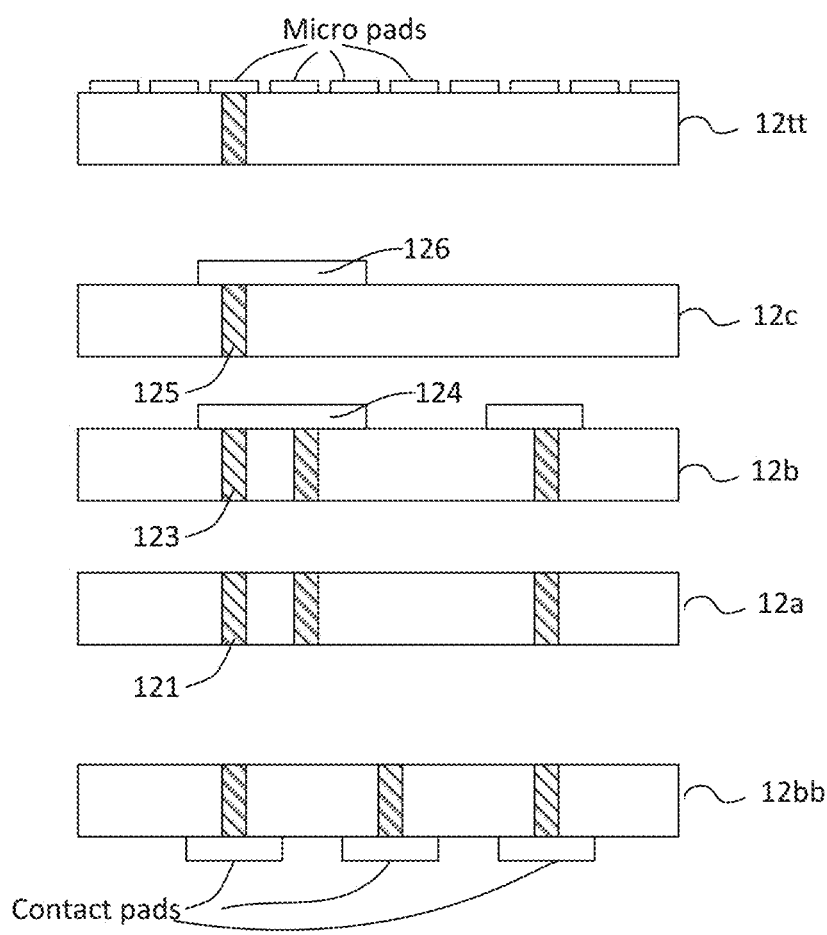
FIG. 12 is a cross-sectional view illustrating a process of manufacturing a multilayer ceramic substrate structure according to embodiments of the present disclosure.

This example discloses the formation of a multilayer ceramic substrate having a dielectric layer formed thereon and a hydrophobic layer formed on the dielectric layer. FIG. 12 is a cross-sectional view illustrating a process of manufacturing a multilayer ceramic substrate structure 1200. The multilayer ceramic substrate structure 1200 includes a first ceramic layer 12*a* including a plurality of first through-holes 121, a second ceramic layer 12*b* including a plurality of second through-holes 123 and a first patterned metal layer 124, a third ceramic layer 12*c* including a plurality of third through-holes 125 and a second patterned layer 126. The method of forming a multilayer ceramic substrate may include sequentially laminating the first ceramic layer 12*a* with the second ceramic layer 12*b*, then the method may also include laminating the third layer 12*c* with the laminated layers 12a and 12b. The method may further include filling the through-holes with a conductive material, e.g., a metal (Ag, Pd, Cu, Ni, etc.). The method may continue laminating more ceramic layers and filling the through-holes until a predetermined thickness and usable substrate is obtained. Thereafter, a bottom layer 12bb including contact pads and through-holes filled with a conductive material and a top layer 12tt including micro pads and through-holes filled with a conductive material are then attached on opposite sides of the substrate to obtain a multilayer ceramic substrate such as the multilayer ceramic substrate 70A or 70B of FIG. 7A or FIG. 7B.

Thereafter, a dielectric layer may be deposited on the formed multilayer ceramic substrate by a conventional deposition (e.g., chemical vapor deposition) process. The dielectric layer may include silicon oxide, silicon nitride, fluorinated silicate glass (FSG), or organo-silicate glass (OSG). The dielectric layer is then coated with a hydrophobic material. The hydrophobic material may be coated using a spin-spray process where the hydrophobic material is sprayed onto the surface of the dielectric layer. For example, the surface of the dielectric layer is exposed to a hydrophobic solution at a certain temperature and for a certain time duration. For example, the hydrophobic material may be formed on the dielectric layer by a deposition (e.g., chemical vapor deposition) process. The hydrophobic material may include organic or inorganic materials such as octadecyltrichlorosilane, perfluorodecyltrichlorosilane, other fluorinated layers such as tetrafluoroethylene, and the like.

Example 5

Figure 13A:
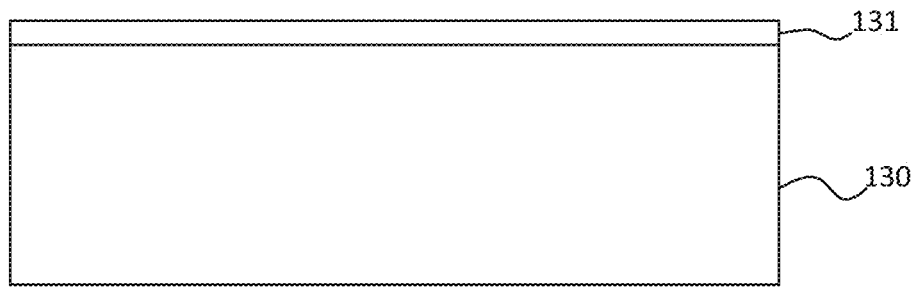
FIGS. 13A through 13H show cross-sectional views illustrating intermediate steps in a process of manufacturing a single-layer substrate according to embodiments of the present disclosure.
Figure 13B:
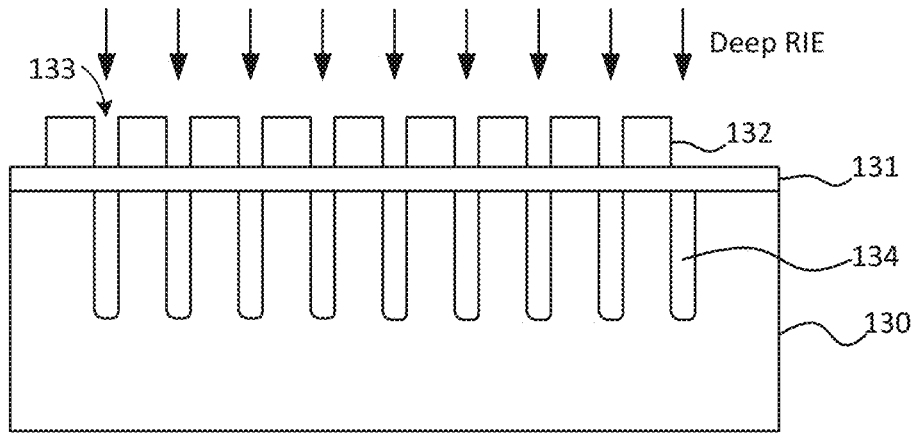
Figure 13C:
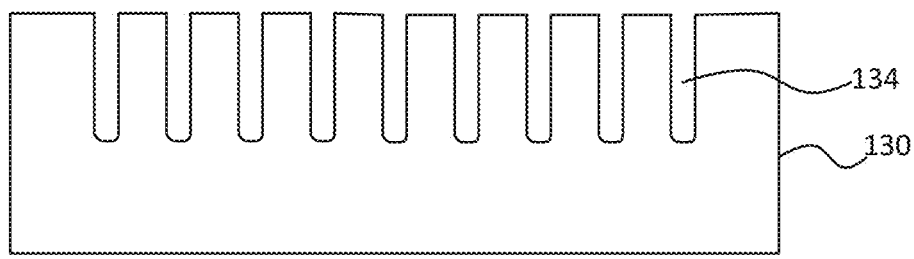
Figure 13D:
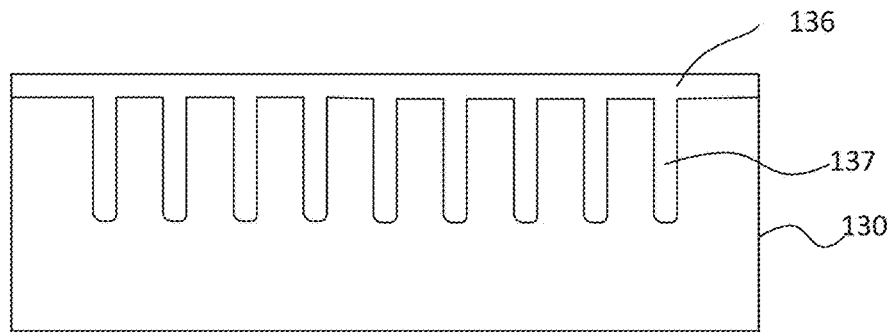
Figure 13E:
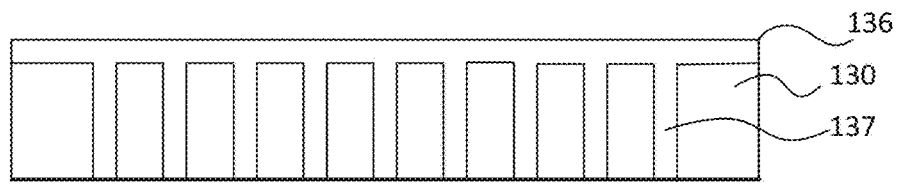
Figure 13F:
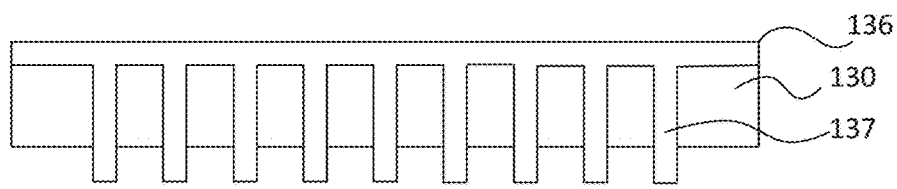
Figure 13G:
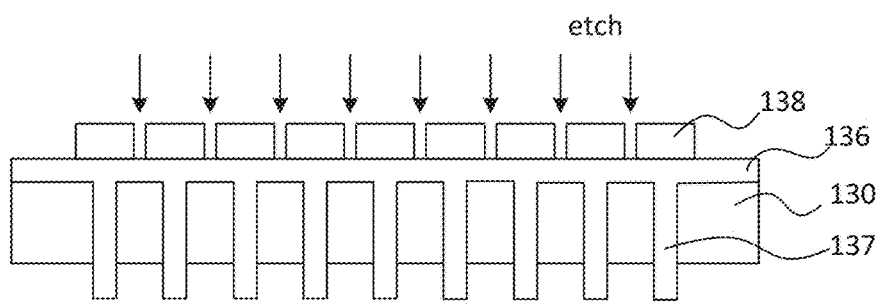
Figure 13H:
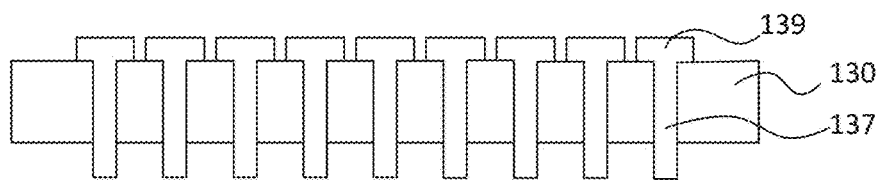

This example discloses the formation of a single-layer substrate having an array of electrodes disposed on an upper surface, a plurality of contact holes, and a plurality of conductive features filling the contact holes such as the substrate 71B shown in FIG. 7B. FIGS. 13A through 13H show cross-sectional views illustrating intermediate steps in a process of manufacturing a single-layer substrate. In one embodiment, a substrate 130 is provided. Substrate 130 may have an insulating layer 131 (silicon oxide, silicon nitride, or other insulating materials) disposed or grown thereon, as shown in FIG. 13A. Referring to FIG. 13B, a patterned layer of photoresist 132 including a plurality of openings 133 is formed on the substrate 130. A deep reactive ion etch (RIE) is performed on the substrate 130 using the photoresist layer 132 as a mask to form a plurality of trenches 134 in the substrate, and thereafter, the patterned layer of photoresist and the insulating layer (if present) are removed, as shown in FIG. 13C. In FIG. 13D, a metal layer (tungsten, aluminum, copper, and the like) is deposited on the substrate to form an upper metal layer 136 and filling the trenches to form a plurality of features 137. A planarization (chemical mechanical polishing) process is performed on the upper metal layer 136 to provide a smooth surface. In FIG. 13E, a planarization (e.g., chemical mechanical polishing) process is performed on the bottom surface of the substrate so that bottom surfaces of the conductive features are exposed and flush (in substantially coplanar relation) with each other. In FIG. 13F, a plasma etch, a wet etch or both are performed to remove a bottom portion of the substrate 130 exposing a portion of side surfaces of the conductive features 137. In FIG. 13G, a patterned photoresist layer 138 is deposited on the upper metal layer 136, and a plasma etch or a wet etch process is performed on the upper metal surface 136 using the patterned photoresist layer 138 as a mask to partition the upper metal layer 136 into a plurality of electrodes 139 that are spaced apart from each other. FIG. 13H shows a cross-sectional view of a single-layer substrate formed after the above steps have been performed. The single-layer substrate may be the disposable substrate 71B shown in FIG. 7B. The substrate may include ceramic, resin, glass, plastics, or other insulating materials.

Although the processes described herein are described with respect to a certain number of steps being performed in a certain order, it is contemplated that additional steps may be included that are not explicitly shown and/or described. Further, it is contemplated that fewer steps than those shown and described may be included without departing from the scope of the described embodiments (i.e., one or some of the described steps may be optional). In addition, it is contemplated that the steps described herein may be performed in a different order than that described.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

For all flowcharts herein, it will be understood that many of the steps can be combined, performed in parallel or performed in a different sequence without affecting the functions achieved.

What is claimed is:

1. A method for manufacturing an apparatus for manipulating a droplet, the method comprising:
   providing a socket for receiving a package containing an integrated circuit, the socket comprising a socket body including a plurality of upper contact pins disposed on a surface of the socket body and configured to receive electrical signals from the integrated circuit;
   providing a disposable substrate having a first surface including a plurality of electrodes, a second surface opposite the first surface, a plurality of vias extending through the disposable substrate, and a plurality of conductive features each having a raised portion protruding from the second surface, wherein the disposable substrate is configured to receive the droplet on the first surface; and
   attaching the disposable substrate to the surface of the socket body using a fastening member so that the conductive features of the disposable substrate are in electrical and physical contact with the upper contact pins of the socket to provide the electrical signals to the electrodes for manipulating the droplet.

2. The method of claim 1, wherein the socket is a ball grid array socket.

3. The method of claim 1, wherein the socket is a land grid array socket.

4. The method of claim 1, wherein the disposable substrate is a single layer substrate, wherein the electrodes and the vias comprise a same conductive material.

5. The method of claim 4, wherein the conductive material comprises copper.

6. The method of claim 1, wherein the conductive features are aligned with the upper contact pins.

* * * * *